United States Patent
Inakawa et al.

(10) Patent No.: US 10,637,018 B2
(45) Date of Patent: Apr. 28, 2020

(54) BATTERY MODULE, ELECTRICITY STORAGE DEVICE, ELECTRICITY STORAGE SYSTEM, ELECTRONIC DEVICE, ELECTRIC-POWERED VEHICLE, AND POWER SYSTEM

(71) Applicant: Murata Manufacturing Co., Ltd., Kyoto (JP)

(72) Inventors: Tetsuo Inakawa, Fukushima (JP); Ryo Tanabe, Tochigi (JP); Yasuhiro Tonomura, Tochigi (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 186 days.

(21) Appl. No.: 15/309,540

(22) PCT Filed: Mar. 18, 2015

(86) PCT No.: PCT/JP2015/001496
§ 371 (c)(1),
(2) Date: Nov. 8, 2016

(87) PCT Pub. No.: WO2015/190018
PCT Pub. Date: Dec. 17, 2015

(65) Prior Publication Data
US 2017/0141366 A1    May 18, 2017

(30) Foreign Application Priority Data
Jun. 9, 2014    (JP) .................................. 2014-118322

(51) Int. Cl.
*H01M 2/10* (2006.01)
*B60K 6/46* (2007.10)
(Continued)

(52) U.S. Cl.
CPC ............. *H01M 2/1077* (2013.01); *B60K 1/04* (2013.01); *B60K 6/46* (2013.01); *H01M 2/20* (2013.01);
(Continued)

(58) Field of Classification Search
CPC .. H01M 2220/20; H01M 2/1077; H01M 2/20; H01M 2/206
See application file for complete search history.

(56) References Cited

U.S. PATENT DOCUMENTS

2012/0156537 A1*  6/2012  Meintschel ......... B60L 11/1874
                                                              429/99
2012/0270094 A1   10/2012  Hohenthanner et al.
(Continued)

FOREIGN PATENT DOCUMENTS

CN    102356482    2/2012
JP    2004-031122 A    1/2004
(Continued)

OTHER PUBLICATIONS

International Search Report (with English translation) dated Jun. 16, 2015 in corresponding international application No. PCT/JP2015/001496 (5 pages).
(Continued)

*Primary Examiner* — Robert S Jones
*Assistant Examiner* — Victoria H Lynch
(74) *Attorney, Agent, or Firm* — K&L Gates LLP

(57) ABSTRACT

A battery module includes a stacked structure including: at least a plurality of stacked battery units; an insulating rod member passing through the stacked structure; and a tightening member that tightens the stacked structure from both ends of the insulating rod member passing through the stacked structure. The tightening member tightens the stacked structure to fasten the battery units, so that the close contact portions of the conductive members of adjacent ones of the battery units are brought in close contact with each other and the adjacent battery units are electrically connected with each other.

18 Claims, 17 Drawing Sheets

(51) Int. Cl.
  *H01M 2/20* (2006.01)
  *B60K 1/04* (2019.01)
  *B60L 50/64* (2019.01)

(52) U.S. Cl.
  CPC ............ *H01M 2/206* (2013.01); *B60L 50/64* (2019.02); *H01M 2220/20* (2013.01)

(56) References Cited

U.S. PATENT DOCUMENTS

2012/0301763 A1* 11/2012 Tonomura ............... H01M 2/06
 429/99
2015/0017504 A1 1/2015 Isshiki et al.

FOREIGN PATENT DOCUMENTS

| JP | 2004-047167 A | 2/2004 |
| JP | 2005-268029 A | 9/2005 |
| JP | 2007-035311 A | 2/2007 |
| JP | 2007-506242 A | 3/2007 |
| JP | 2011-014278 A | 1/2011 |
| JP | 2012-138268 A | 7/2012 |
| JP | 2012-520550 A | 9/2012 |
| JP | 2012-256521 A | 12/2012 |
| JP | 2013-012458 | 1/2013 |
| JP | 2013-037914 A | 2/2013 |
| JP | 2013-239255 A | 11/2013 |
| KR | 10-2012-0006973 | 1/2012 |
| WO | 2011/145547 A1 | 11/2011 |
| WO | 2013/145917 A1 | 10/2013 |

OTHER PUBLICATIONS

Written Opinion dated Jun. 16, 2015 in corresponding international application No. PCT/JP2015/001496 (3 pages).
European Patent Office, Extended European Search Report for European Patent Application No. 15807573.9 (related to above-captioned patent application), dated Nov. 7, 2017.
Chinese Office Action dated Nov. 12, 2018 in corresponding Chinese Application No. 201580030251.7.
Korean Office Action dated Sep. 20, 2019 in corresponding Korean Application No. 10-2016-7033085.

* cited by examiner

FIG. 7
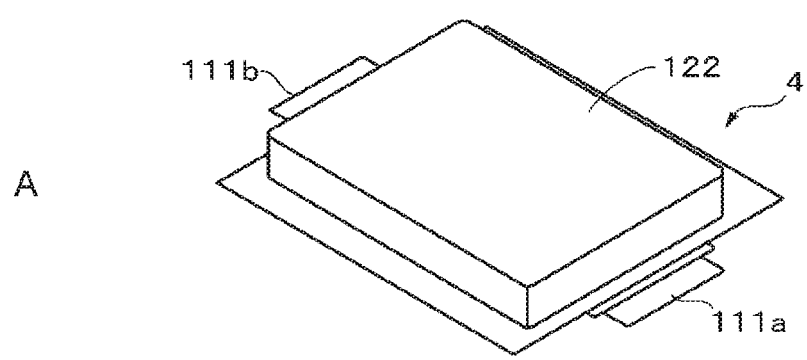
A
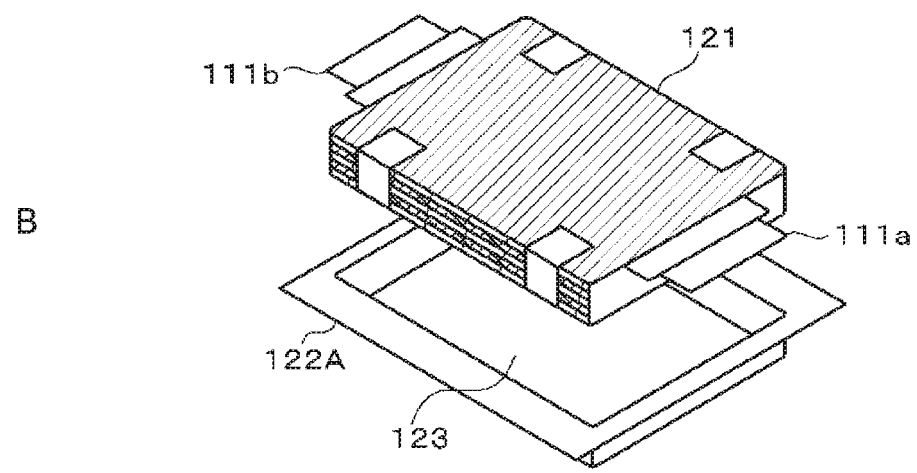
B
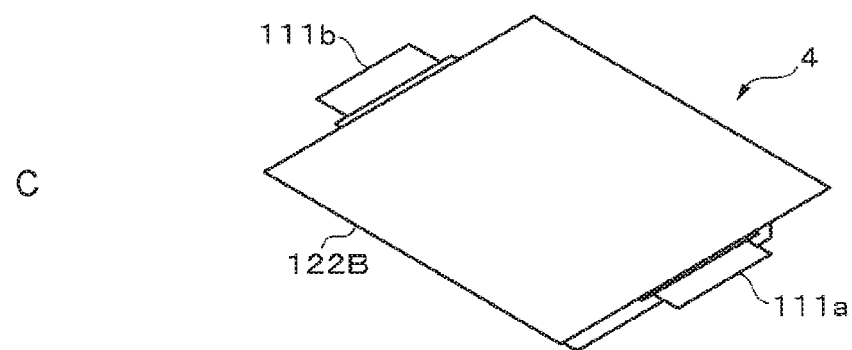
C

US 10,637,018 B2

BATTERY MODULE, ELECTRICITY STORAGE DEVICE, ELECTRICITY STORAGE SYSTEM, ELECTRONIC DEVICE, ELECTRIC-POWERED VEHICLE, AND POWER SYSTEM

CROSS-REFERENCE TO RELATED APPLICATIONS

The present application claims the benefit of International Application No. PCT/JP2015/001496, filed Mar. 18, 2015, which claims priority to Japanese Application No. 2014-118322, filed Jun. 9, 2014, the entire contents of which are incorporated herein by reference.

BACKGROUND

The present technology relates to a battery module, an electricity storage device, an electricity storage system, an electronic device, an electric-powered vehicle, and a power system.

In recent years, lithium-ion secondary batteries have begun to be widely used for industries such as electric vehicles and electricity storage. In view of reduction in weight and space saving, replacement of lead batteries for vehicles with lithium-ion secondary batteries have been increasing in the market. In use of lithium-ion secondary batteries in automobiles and the like, various fixing methods have been used as measures against vibration and impact.

For example, Patent Document 1 discloses a structure in which a plurality of cell units having terminals connected with bus bars are fixed by rods for adjusting the heights of the cell units and fixing the cell units, which prevents stress on the terminals to improve reliability and durability.

For example, Patent Document 2 discloses a structure in which a terminal strip is placed between end faces of a rod member to fix assembled batteries.

CITATION LIST

Patent Documents

Patent Document 1: Japanese Patent Application Laid-Open No. 2004-31122
Patent Document 2: Japanese Patent Application Laid-Open No. 2007-35311

SUMMARY

Problems to be Solved by the Invention

There have been demands for improving long-term reliability of connection between battery cells of battery modules.

An object of the present technology is therefore to provide a battery module capable of improving the long-term reliability of connection between battery cells, and an electricity storage device, an electricity storage system, an electronic device, an electric-powered vehicle, and a power system having the battery module.

Solutions to Problems

To solve the aforementioned problems, the present technology is a battery module including: a stacked structure including at least a plurality of stacked battery units; an insulating rod member passing through the stacked structure; and a tightening member that tightens the stacked structure from both ends of the insulating rod member passing through the stacked structure, wherein each of the battery units includes: a plurality of battery cells; a battery support having a coupling portion through which a first hole penetrating between both end faces of the coupling portion is formed, the battery support holding the battery cells; and a conductive member having a second hole formed therein, and including a close contact portion in close contact with one or another of the both end faces of the coupling portion, and a joining portion connected to an electrode tab of the battery cell, and the insulating rod member passes through the first holes and the second holes of the stacked units and penetrates through the coupling portions and the close contact portions of the battery units positioned on a line along a stacking direction, and the tightening member tightens the stacked structure to fasten the battery units, so that the close contact portions of the conductive members of adjacent ones of the battery units are brought in close contact with each other and the adjacent battery units are electrically connected with each other.

An electricity storage device, an electricity storage system, an electronic device, an electric-powered vehicle, and a power system of the present technology include the battery module described above.

Effects of the Invention

According to the present technology, long-term reliability of connection between battery cells is improved.

BRIEF DESCRIPTION OF DRAWINGS

FIG. 7A is a schematic drawing illustrating an external appearance of a battery cell that can be used in the present technology.
FIG. 7B is a schematic drawing illustrating a structure of the battery cell.
FIG. 7C is a schematic drawing illustrating an external appearance of a bottom face side of the battery cell.

DETAILED DESCRIPTION (Technological Background)

First, a technological background of the present technology will be described for easy understanding of the present technology. In a battery module including a plurality of battery cells, the volume occupied by components other than batteries needs to be reduced for improvement of energy density per unit volume. There have thus been demands for reduction in the size of components and reduction in the number of components.

Figure 1:
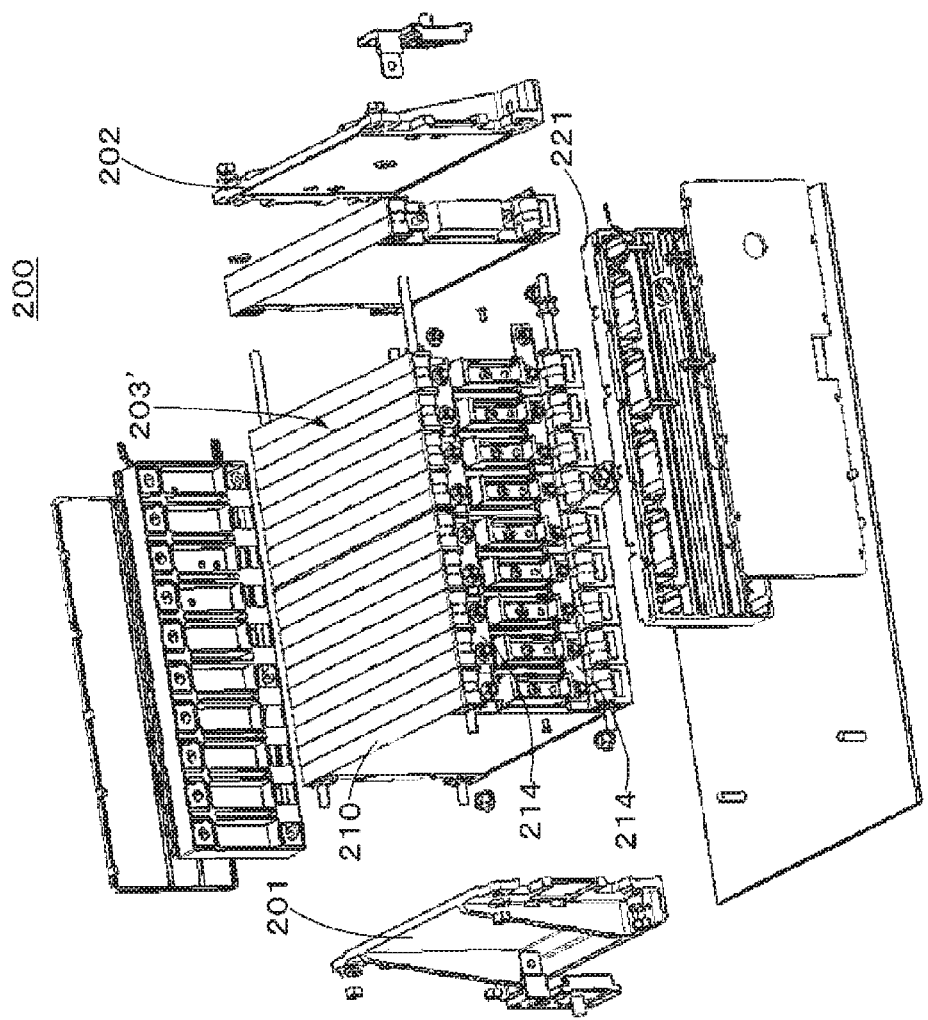
FIG. 1 is an exploded perspective view illustrating an example structure of a typical battery module.
Figure 2:
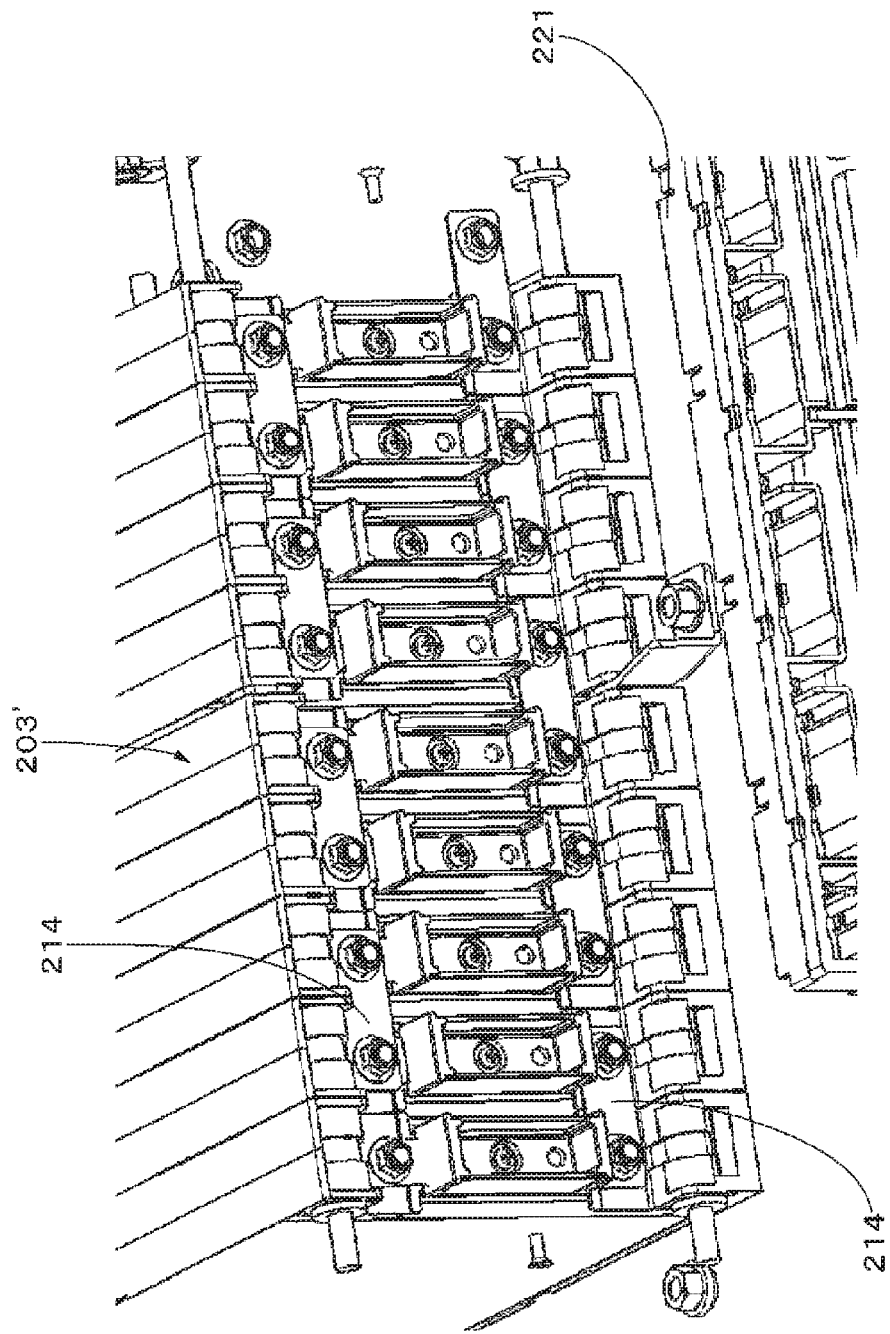
FIG. 2 is an enlarged perspective view of a part of the example structure of the typical battery module.
Figure 3:
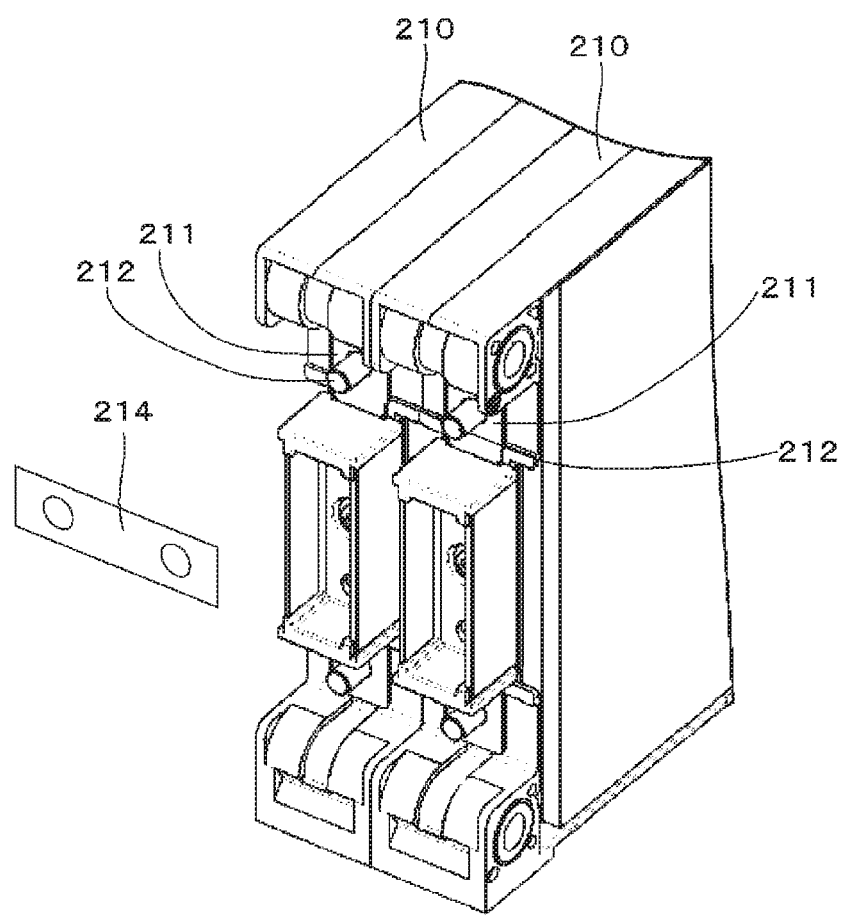
FIG. 3 is an enlarged perspective view of a state before two adjacent battery units are connected by a bus bar.

For a typical battery module, a method of connecting bus bars, which connect battery cells, to one another with bolts is typically used. An outline of an example structure of a typical battery module will be described. FIG. 1 is an exploded perspective view illustrating the example structure of the typical battery module. FIG. 2 is an enlarged perspective view of a part of the example structure of the typical battery module. FIG. 3 is an enlarged perspective view of a state of two adjacent battery units before being connected by a unit bus bar.

As illustrated in FIGS. 1 to 3, in a battery module 200, a battery cell group 203' constituted by a plurality of battery units 210 is disposed between end plates 201 and 202.

Each of the battery units 210 of the battery cell group 203' has one side face to which a conductive member (hereinafter referred to as a unit bus bar) 214 made of copper, aluminum, or the like, for example, is attached for connecting adjacent battery units 210. The unit bus bar 214 is attached over a plurality of battery units 210 to provide a desired battery connection. As illustrated in FIG. 3, adjacent collectors 211 are connected to each other by a unit bus bar 214. The unit bus bar 214 is attached in such a manner that floating bolts 212 are inserted into holes of the unit bus bar 214 and tightened by nuts.

A mis-insertion prevention cover 221 covers a side face of the battery cell group 203' on the near side. The mis-insertion prevention cover 221 positions the unit bus bars 214, and is provided for preventing mis-insertion of the unit bus bars 214.

To the battery module 200 described above, a method of reducing contact resistance at connections by controlling torques of the bolts is typically applied. When the number of bus bars is increased, however, the number of bolts for connecting the bus bars is increased accordingly, which makes the control difficult.

In the battery module 200 described above, a structure in which the battery units 210 are arranged and the unit bus bars 214 connect the collectors 211 with one another is used. Stable surface contact of the unit bus bars 214, however, has become difficult owing to misalignment of the surfaces of adjacent collectors 211. In addition, since high current is applied to the unit bus bars 214, it is difficult to reduce the thickness or the like to make the unit bus bars 214 flexible.

In the battery module 200 described above, mis-insertion of a unit bus bar 214 during assembly causes a fatal problem such as a short circuit due to faulty connection. A separate mis-insertion prevention cover 221 or the like is used as one means for preventing the problem. The possibility of causing a short circuit, however, cannot be eliminated in such a case where the mis-insertion prevention cover 221 is displaced from an appropriate position.

In the battery module 200 described above, if a rigid structure such as stud bolts is used, stress may be concentrated on the bases of the bolts during vibration and cause shear on the bolts, and a typical solution for this is to use floating bolts 212. Use of this solution, however, makes the structure complicated and is one factor of cost increase.

Embodiments of the present technology will be described below with reference to the drawings. Note that the description will be made in the following order.

1. First embodiment (first example of battery module)
2. Second embodiment (second example of battery module)
3. Other embodiments (modifications)
4. Applications Note that the embodiments and the like described below are exemplary specific examples of the present technology, and do not limit the present technology. In addition, the effects mentioned herein are exemplary only and are not limiting, and the possibility of presence of effects other than those presented herein is not to be eliminated.

1. First Embodiment (Structure of Battery Module)

Figure 4:
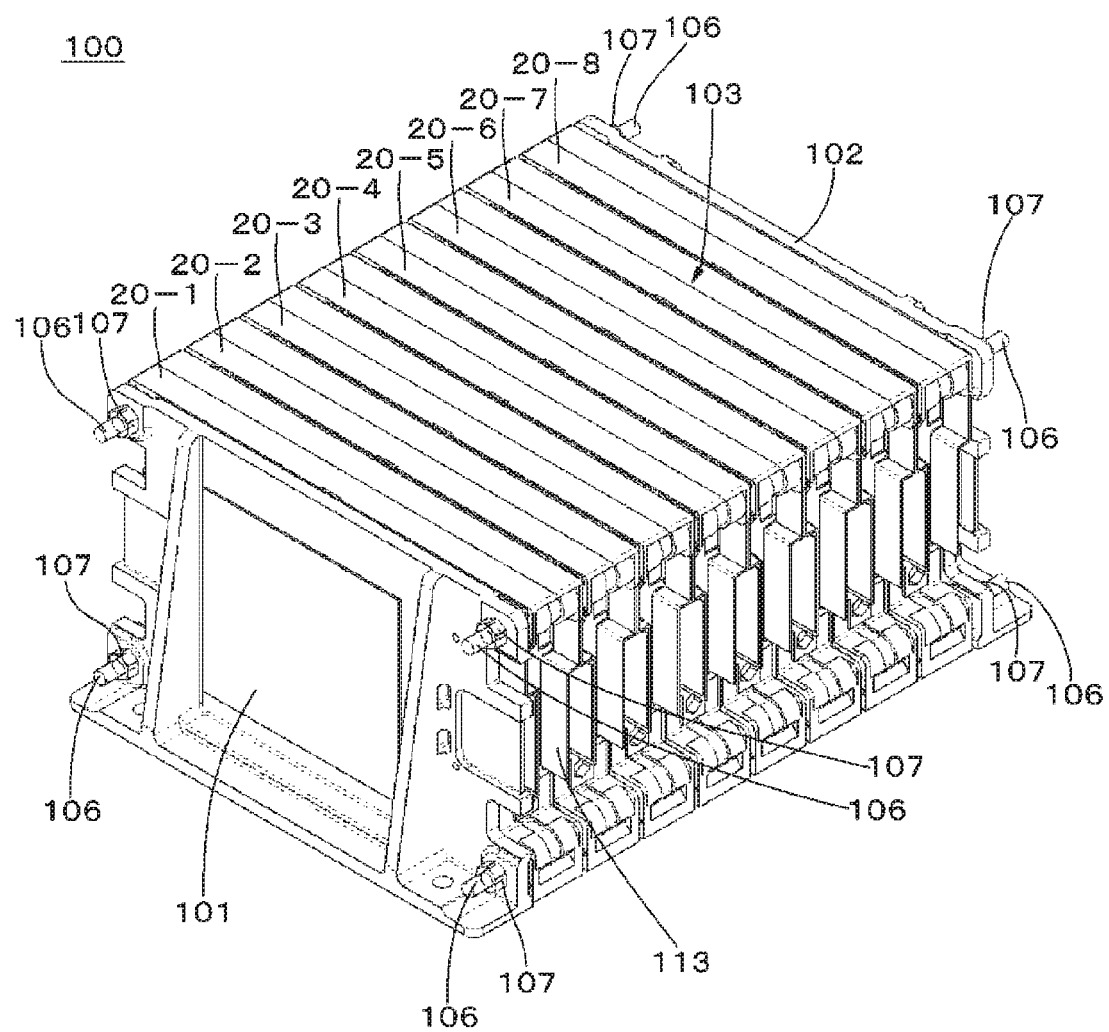
FIG. 4 is a perspective view illustrating an example structure of a battery module.

An example structure of a battery module according to a first embodiment the present technology will be described. FIG. 4 is a perspective view illustrating an example structure of a battery module.

As illustrated in FIG. 4, a battery module 100 has a structure in which a battery cell group 103 is disposed between an end plate 101 and an end plate 102.

(End Plates)

The endplate 101 and the endplate 102 are constituted by plates made of metal such as aluminum or iron, materials obtained by processing the shape of such plates, or the like. Each of the end plate 101 and end plate 102 has holes 7 at the four corners through which shafts 106 are passed.

(Battery Cell Group)

The battery cell group 103 includes a stack of a plurality of battery units 20, each battery unit 20 including a plurality of battery cells housed in a battery support (hereinafter referred to as a bracket). In the first embodiment, two battery cells, for example, are housed in each bracket 1. The bracket 1 is a synthetic resin molding, for example. The battery cell group 103 includes eight battery units 20-1 to 20-8 (that is, 16 battery cells) stacked horizontally. Note that the battery units will be simply referred to as battery units 20 when the individual battery units need not be distinguished. Although not illustrated in FIG. 4, heat transfer plates 108, which are led out from the eight respective brackets 1 and bent into an L-shape, are exposed at a bottom face of the battery cell group 103. The heat transfer plates 108 are brought into contact with a cooling module (not illustrated) and transfers heat produced by the battery cells to the cooling module or the like for heat dissipation. Note that the structure may not include the heat transfer plates 108 and the cooling module.

(Battery Unit)

Figure 5:
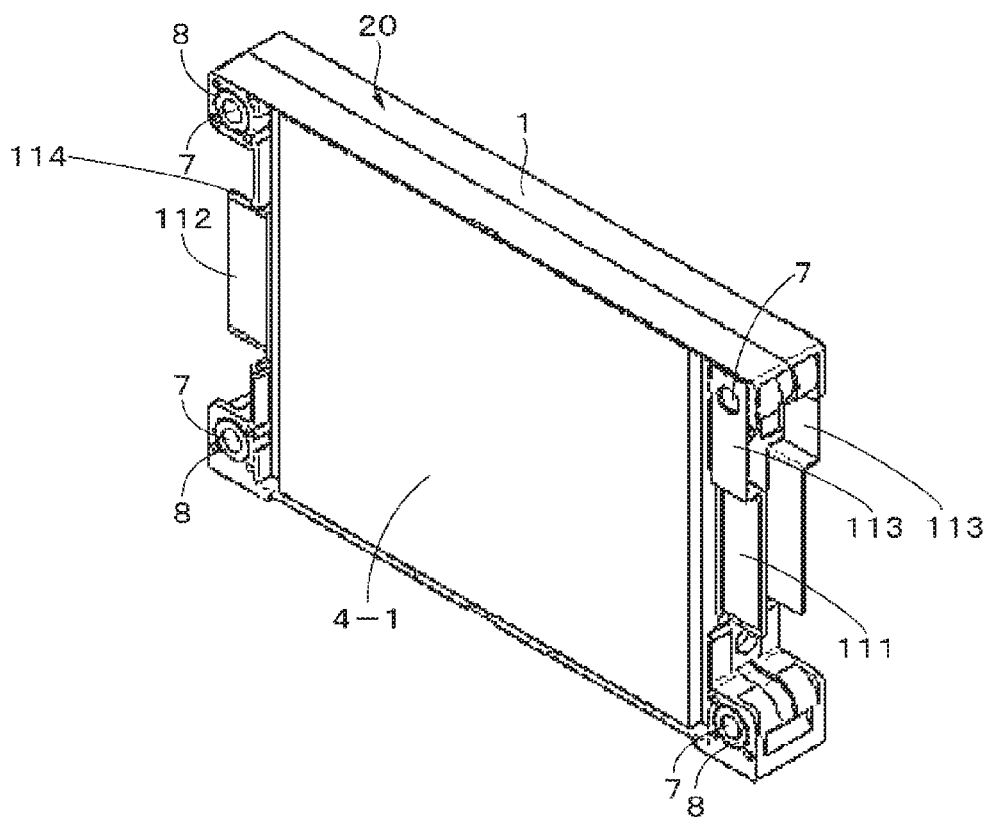
FIG. 5 is a perspective view of a battery unit.

The battery unit 20 that is a unit of elements constituting the battery cell group 103 will be described. FIG. 5 is a perspective view of a battery unit. FIGS. 6A to 6D are a bottom view, a front view, a rear view, and a right side view, respectively, of the battery unit.

As illustrated in FIGS. 5 and 6A to 6D, the battery unit 20 includes two battery cells 4-1 and 4-2, a bracket 1 in which the two battery cells 4-1 and 4-2 are housed, and a heat transfer plate 2. In addition, a first bus bar 113 and a second bus bar 114, which are conductive members, are attached to respective side faces of the battery unit 20. Note that the battery cells will be referred to as the battery cells 4 when the battery cells need not be individually distinguished. The battery cells 4 have a substantially rectangular parallelepiped shape, a flat shape, or the like, for example. A face having the largest area of the faces of a battery cell 4 will be referred to as a main face.

(Bracket)

The bracket 1 is made of an insulating material (such as synthetic resin), for example. The bracket 1 is a synthetic resin molding, for example. The heat transfer plate 2 made of metal such as aluminum is formed integrally with the bracket 1 by insert molding. The insert molding is a molding method of placing an insert (herein, the heat transfer plate 2 and an insulating collar 8 mentioned below) to be embedded in a mold, thereafter injecting plastic into a molding machine, so that the insert is surrounded by molten plastic and the plastic is solidified, to integrate the plastic and the insert with each other. Note that the bracket 1 and the first and second bus bars 113 and 114 may be integrally formed through insert molding. In this case, space can be saved, which can contribute to improvement in battery capacity. In addition, the structure may not include the heat transfer plate 2.

The bracket 1 has a substantially rectangular parallelepiped outer shape, and at each of both ends of aright side face of the bracket 1, a coupling portion 9 protruding therefrom is provided. Similarly, at each of both ends of a left side face of the bracket 1, a coupling portion 9 protruding therefrom is provided. These four coupling portions 9 each have a hole 7 therethrough between both end faces (a face on the front side and a face on the rear side) of the coupling portion 9. For forming the holes 7, the coupling portions 9 are each provided with an insulating collar 8 being a hollow, tubular insulating member in the inside of the coupling portion 9. For example, the insulating collar 8 is formed integrally with the bracket 1 through insert molding, and the hollow space inside the insulating collar 8 corresponds to the hole 7 formed in the coupling portion 9. Since the insulating collar 8 is provided in the inside, the influence of expansion and contraction due to changes in environmental temperature is reduced. Examples of the material for the insulating collar 8 include an insulating material such as ceramics such as alumina.

Recesses, which are spaces in which a pair of battery cell 4-1 and battery cell 4-2 is housed, are formed in the front face and the rear face, respectively, of bracket 1. For example, each of the recesses is a space of a substantially rectangular parallelepiped shape formed in a recessed shape. The depth of each of the recesses is preferably larger than the thickness of the battery cell 4 so that the main face of the battery cell 4 does not stick out. A bottom face of each of the recesses includes the heat transfer plate 2 fixed to the insulating material (bracket 1) formed into a frame having an opening, for example. The pair of recesses are formed to be substantially symmetric with respect to a center surface, that is, the bottom face including the heat transfer plate 2 and the insulating material.

The heat transfer plate 2 is positioned at the central opening of the bracket 1, and constitutes a surface to which the battery cells 4 are attached. Furthermore, an end of the heat transfer plate 2 protrudes to the outside of the bracket 1, is bent into a substantially L shape along a side face of the bracket 1, and a bent portion 2a is formed. The width of the bent portion 2a is slightly smaller than 1.5 times the width of the battery unit 20. Thus, an end of the bent portion 2a protrudes from the width of the battery unit 20. Although not illustrated, the bent portion 2a of the heat transfer plate 2 comes into contact with a cooling surface of the cooling module. The cooling module is a water-cooling or air-cooling cooler, for example.

In the example illustrated in FIGS. 6A to 6D, one end of the heat transfer plate 2 is bent into an L-shape. Note that the other end of the heat transfer plate 2 may similarly be formed to protrude outward from the bracket 1 and similarly be bent into an L shape. Furthermore, the heat transfer plate 2 may have a T shape or an H shape in cross section with both ends extending outwards.

The main faces of the battery cell 4-1 and the battery cell 4-2 are brought into close contact with the heat transfer plate 2 on the face of the heat transfer plate 2 integrated with the bracket 1 Although not illustrated, a thermally-conductive adhesive sheet may be provided between the heat transfer plate 2 and the main face of the battery cell 4-1. Similarly, a thermally-conductive adhesive sheet may be provided between the heat transfer plate 2 and the main face of the battery cell 4-2.

Figure 6:
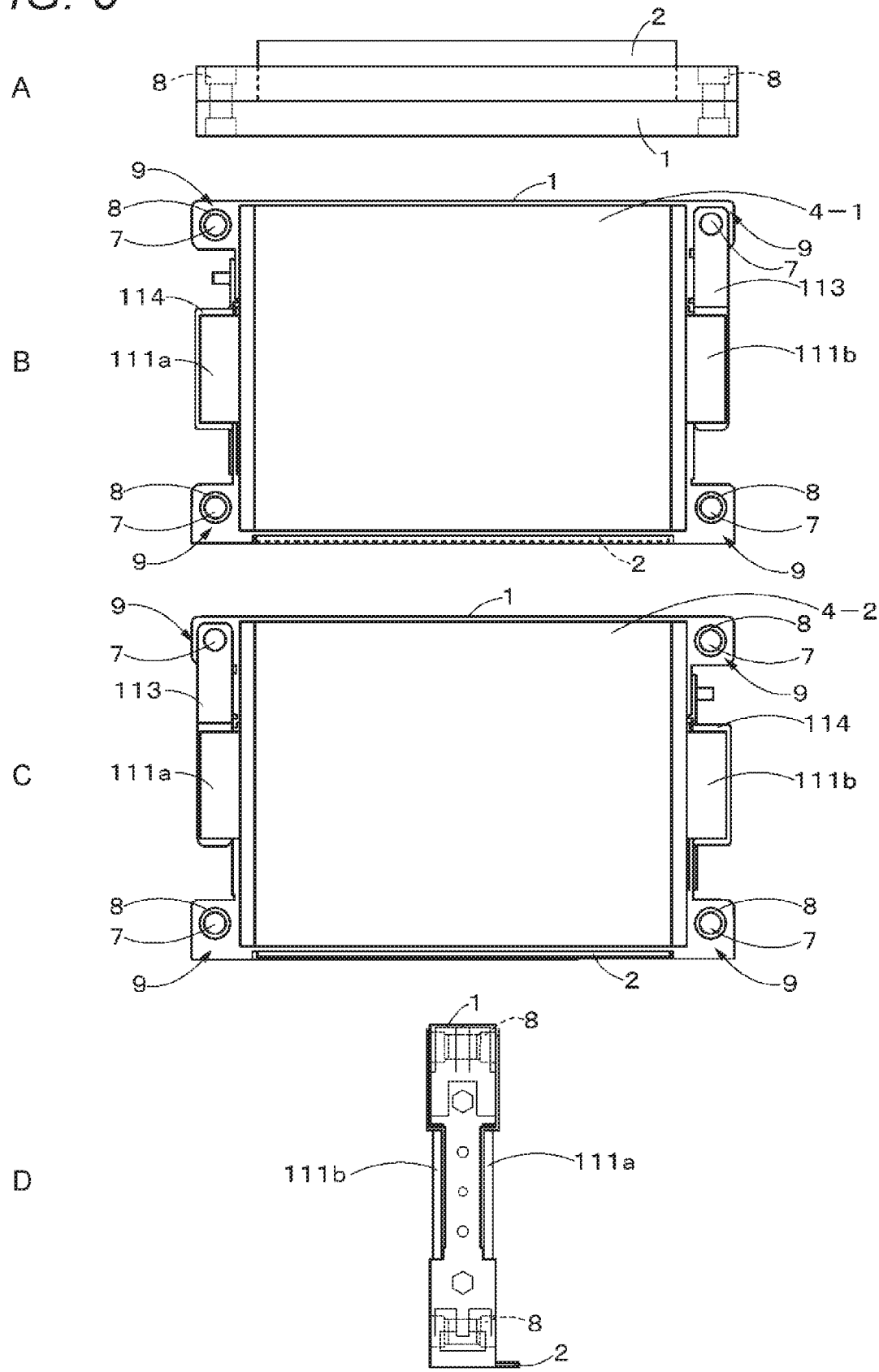
FIGS. 6A to 6D are a bottom view, a front view, a rear view, and a right side view, respectively, of the battery unit.

Positive/negative electrode tabs 111 are led out from both side face of the respective battery cells 4-1 and 4-2. The polarity of each of the electrode tabs 111 changes between positive and negative depending on the orientations of the battery cells 4-1 and 4-2 attached to the bracket 1. As illustrated in FIGS. 6B and 6C, a positive electrode tab 111a of the battery cell 4-1 and a negative electrode tab 111b of the battery cell 4-2 protrude from one side face of the bracket 1. A negative electrode tab 111b of the battery cell 4-1 and a positive electrode tab 111a of the battery cell 4-2 protrude from the other side face of the bracket 1. Note that the electrode tabs will be referred to as the electrode tabs 111 when the positive electrode tab 111a and the negative electrode tab 111b need not be individually distinguished.

(Structure of Battery Cell)

FIG. 7A is a schematic drawing illustrating an external appearance of a battery cell 4 that can be used in the present technology. The battery cell 4 is a nonaqueous electrolyte battery or the like, and is a lithium-ion secondary battery, for example. FIG. 7B is a schematic drawing illustrating a structure of the battery cell 4. Note that FIG. 7B illustrates the structure in a state in which the bottom face and the top face of the battery cell 4 illustrated in FIG. 7A are reversed. FIG. 7C is a schematic drawing illustrating an external appearance of the bottom face side of the battery cell 4. The battery cell 4 includes a cell element 121, and an exterior material 122 containing the cell element 121.

The exterior material 122 is constituted by a first exterior portion 122A containing the cell element 121, and a second exterior portion 122B serving as a lid covering the cell element 121. The exterior material 122 and the cell element 121 are preferably in close contact with each other.

The cell element 121 has a stacked electrode structure in which a positive electrode having a substantially rectangular shape and a negative electrode having a substantially rectangular shape disposed opposite to the positive electrode are stacked alternately with a separator therebetween. In addition, a positive electrode collector exposed portion, which is electrically connected with each of the positive electrodes, and a negative electrode collector exposed portion, which is electrically connected with each of the negative electrodes, are led out from the cell element 121. The positive electrode tab 111*a* and the negative electrode tab 111*b* are connected to the positive electrode collector exposed portion and the negative electrode collector exposed portion, respectively.

The cell element 121 as described above is externally covered by the exterior material 122, and the positive electrode tab 111*a* and the negative electrode tab 111*b* are led out to the outside of the battery cell 4 from a sealed portion of the exterior material 122. The exterior material 122 is subjected to deep drawing on at least one face thereof or on both faces thereof in advance, so that a recessed portion 123 is formed, and the cell element 121 is accommodated in the recessed portion 123. In FIG. 7B, the recessed portion 123 is formed in the first exterior portion 122A of the exterior material 122, and the cell element 121 is accommodated in the recessed portion 123.

The second exterior portion 122B is then placed to cover the opening of the recessed portion 123, and sealing is achieved by adhesion of the periphery of the opening of the recessed portion 123 through welding or the like. The positive electrode tab 111*a* and the negative electrode tab 111*b* are led out in two directions opposite to each other.

For the exterior material 122, a film exterior material or the like can be used. Examples of the film exterior material includes a film having a structure in which plastic layers are provided on both sides of a metal layer made of a metallic foil, such as an aluminum laminate film in which a nylon film, an aluminum foil, and a polyethylene film are laminated in this order.

One example of the exterior material 122 is a material having a laminated structure of an external plastic layer, a metal layer, and an internal plastic layer, for example. The exterior material 122 has a structure in which outer edges of two rectangular aluminum laminated films are adhered to each other by fusion or with an adhesive so that the internal plastic layer faces the cell element, for example. A plurality of external plastic layers and a plurality of internal plastic layers may be provided.

A metal material for the metal layer may be any metal having a function as a barrier film resistant to moisture permeation, such as an aluminum (Al) foil, a stainless steel (SUS) foil, a nickel (Ni) foil, or a plated iron (Fe) foil. Among others, it is preferable to suitably use an aluminum foil, which is thin, lightweight, and excellent in processability. In particular, in terms of processability, annealed aluminum (JIS A8021P-O), (JIS A8079P-O), (JIS A1N30-O), or the like is preferably used, for example.

Preferably, the thickness of the metal layer is typically 30 μm or larger and 150 μm or smaller, for example. If the thickness is smaller than 30 μm, the material strength tends to be lowered. On the other hand, if the thickness exceeds 150 μm, processing becomes significantly difficult, the thickness of the laminate film increases, and the volumetric efficiency of the nonaqueous electrolyte battery tends to be lowered.

The internal plastic layer is a part that is melted by heat and fused together, and polyethylene (PE), cast polypropylene (CPP), polyethylene terephthalate (PET), low-density polyethylene (LDPE), high-density polyethylene (HDPE), linear low-density polyethylene (LLDPE), or the like can be used for the internal plastic layer, or a plurality of materials may be selected therefrom to be used for the internal plastic layer.

For the external plastic layer, polyolefin resin, polyamide resin, polyimide resin, polyester, or the like is used because of the beauty of the external appearance, strength, flexibility, and the like. Specifically, nylon (Ny), polyethylene terephthalate (PET), polyethylene naphthalate (PEN), polybutylene terephthalate (PBT), or polybutylene naphthalate (PBN) is used, or a plurality of materials selected therefrom can be used.

Instead of the aluminum laminated film having the laminated structure as described above, the exterior material 122 may be constituted by a laminate film having another laminated structure, or by a film exterior material such as a polymer film such as polypropylene or a metal film.

Note that the structure of the battery cell applicable to the present technology is not limited to those described above. For example, the structure may be such that a separator is formed in a long strip and folded in zigzag, and a positive electrode and a negative electrode are stacked by being placed into the folded separator. Furthermore, the structure may be such that a rolled electrode member to which a positive electrode tab and a negative electrode tab are attached is accommodated inside a film exterior material.

(Bus Bar)

Figure 8:
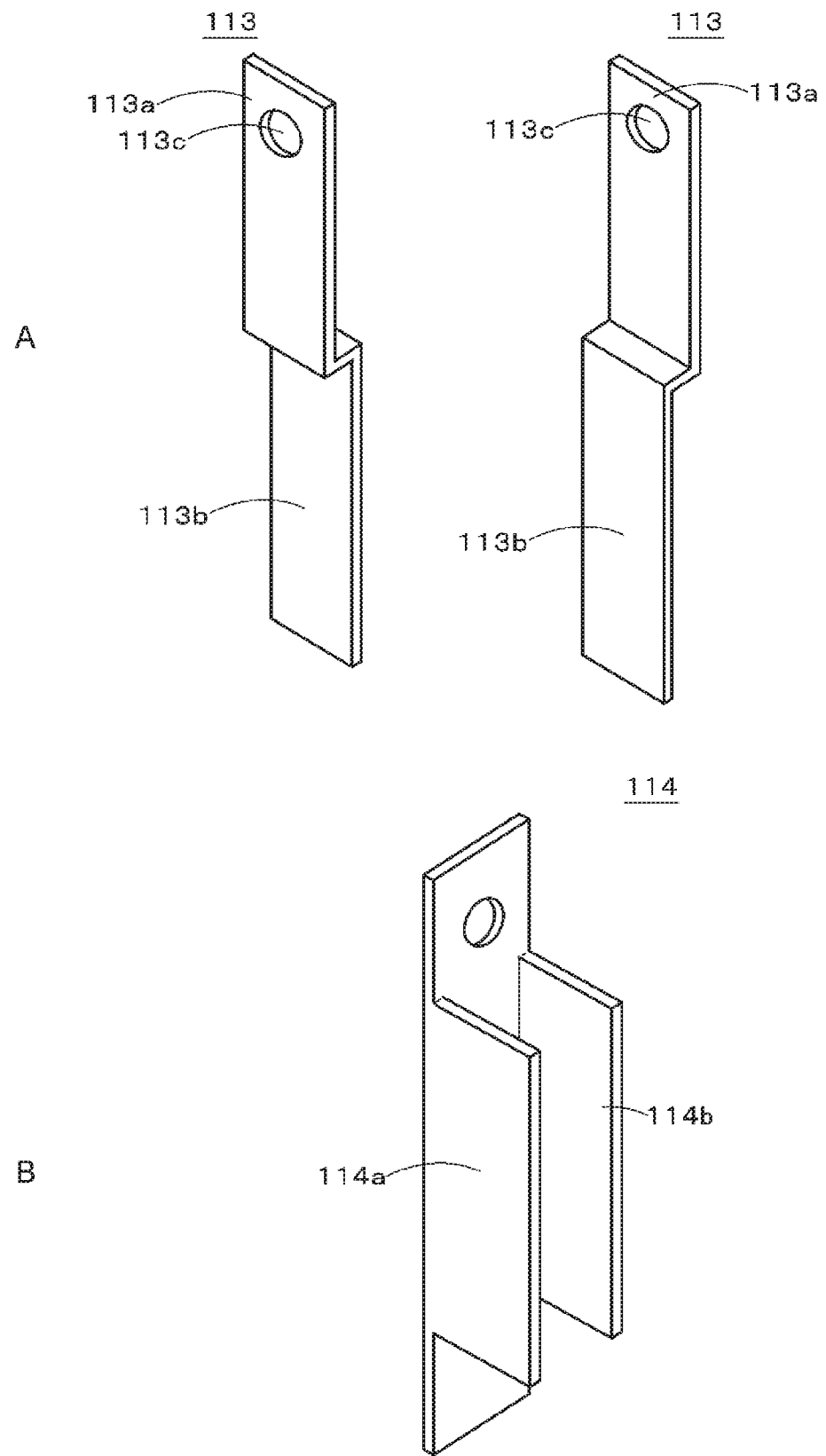
FIG. 8A is a perspective view illustrating an example structure of a first bus bar.
FIG. 8B is a perspective view illustrating an example structure of a second bus bar.

FIG. 8A is a perspective view illustrating an example structure of the first bus bar, and FIG. 8B is a perspective view illustrating an example structure of the second bus bar. The first bus bar 113 is a conductive member made of a conductive material such as copper or aluminum for electrically connecting adjacent battery units 20. The second bus bar 114 is a conductive member made of a conductive material such as copper or aluminum for electrically connecting two battery cells 4, which constitute one battery unit 20, with each other.

(First Bus Bar)

As illustrated in FIG. 8A, the first bus bar 113 is a conductive plate member at least having a joining portion 113*b* and a close contact portion 113*a*. The joining portion 113*b* is a portion having an outer face connected with at least the electrode tabs 111 of the battery cell 4. The close contact portion 113*a* is a portion having an outer face and an inner face opposite thereto, which are brought into close contact with the coupling portions 9 of the bracket 1, the outer face being brought in close contact with the close contact portion 113*a* of another first bus bar 113.

The close contact portions 113*a* of the two first bus bars 113 are brought in close contact with the respective end faces of the coupling portions 9, and the two close contact portions 113*a* are attached to the bracket 1 with the coupling portions 9 therebetween. The close contact portion 113*a* has a hole 113*c* having substantially the same size as the hole 7 formed in the coupling portions 9. In a state where a pair of first bus bars 113 is attached to the bracket 1, the holes 113*c* of a pair of close contact portions 113*a* and the holes 7 of the coupling portions 9 are aligned on a straight line along the stacking direction so that the shafts 106 can pass through the coupling portions 9 and the close contact portions 113*a* between which the coupling portions 9 are positioned.

The example of the first bus bar 113 illustrated in FIG. 8A is a conductive plate member having bent portions, which is a rectangular plate member bent at two positions at substantially right angle so as to have a step at a substantially central portion.

The conductive plate member having the bent portion includes, for example, a portion having a rectangular planar shape from one bent portion to one end in the longitudinal direction, which is the close contact portion 113*a*, a portion having a rectangular planar shape from the other bent portion to the other end in the longitudinal direction, which is the joining portion, and a portion having a rectangular planar shape between one bent portion and the other bent portion.

(Second Bus Bar)

As illustrated in FIG. 8B, the second bus bar 114 is a conductive plate member at least having a first joining portion 114a connected with the electrode tabs 111 of one battery cell 4-1 of one battery unit 20, and a second joining portion 114b connected with the electrode tabs 111 of the other battery cell 4-2.

The example of the second bus bar 114 illustrated in FIG. 8B is a conductive plate member including, for example, a bottom portion, and a pair of wall portions being opposed to each other and standing on at least part of both ends of the bottom portion, which are the first joining portion 114a and the second joining portion 114b.

(Connection Structures Between Battery Cells and Between Battery Units)

A plurality of battery units 20 are stacked, and the battery cells 4 are electrically connected in series and/or in parallel, to form the battery cell group 103. Such a structure is applied to an electric-powered vehicle or the like requiring a high-power, high-capacity battery, for example.

Figure 9:
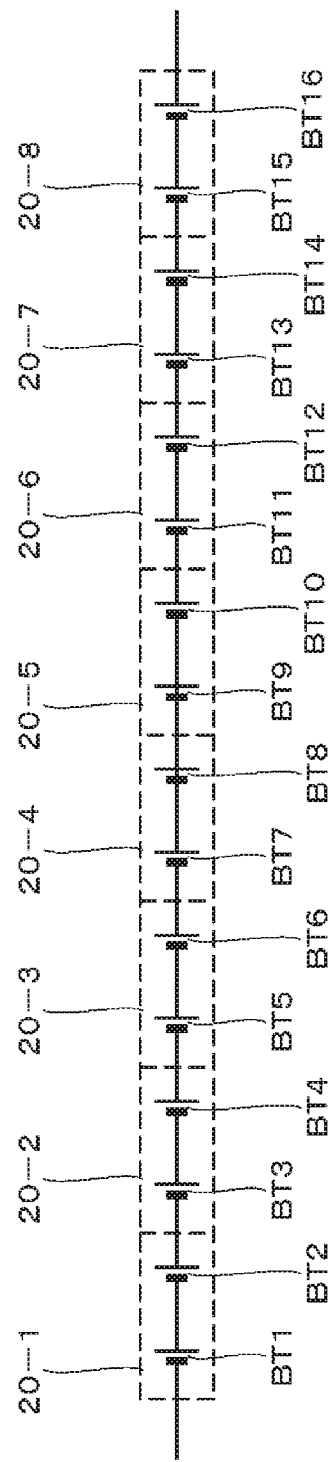
FIG. 9 is a circuit diagram illustrating an outline of an electrical configuration of a battery module.

In the example of the battery module 100 illustrated in FIG. 4, a battery unit 20-1 includes a battery cell BT1 and a battery cell BT2 as illustrated in FIG. 9. A battery unit 20-2 includes a battery cell BT3 and a battery cell BT4. A battery unit 20-3 includes a battery cell BT5 and a battery cell BT6. A battery unit 20-4 includes a battery cell BT7 and a battery cell BT8. A battery unit 20-5 includes a battery cell BT9 and a battery cell BT10. A battery unit 20-6 includes a battery cell BT11 and a battery cell BT12. A battery unit 20-7 includes a battery cell BT13 and a battery cell BT14. A battery unit 20-8 includes a battery cell BT15 and a battery cell BT16.

Battery units 20 adjacent in the stacking direction are electrically connected with each other by a pair of first bus bars 113 whose close contact portions 113a are in close contact with each other, and a pair of battery cells 4 in one battery unit 20 are electrically connected with each other by one second bus bar 114. In this manner, 16 battery cells BT1 to BT16 are electrically connected in series to form the battery cell group 103. Note that the connection structure of the battery cells BT1 to BT16 is not limited to this example.

Figure 10:
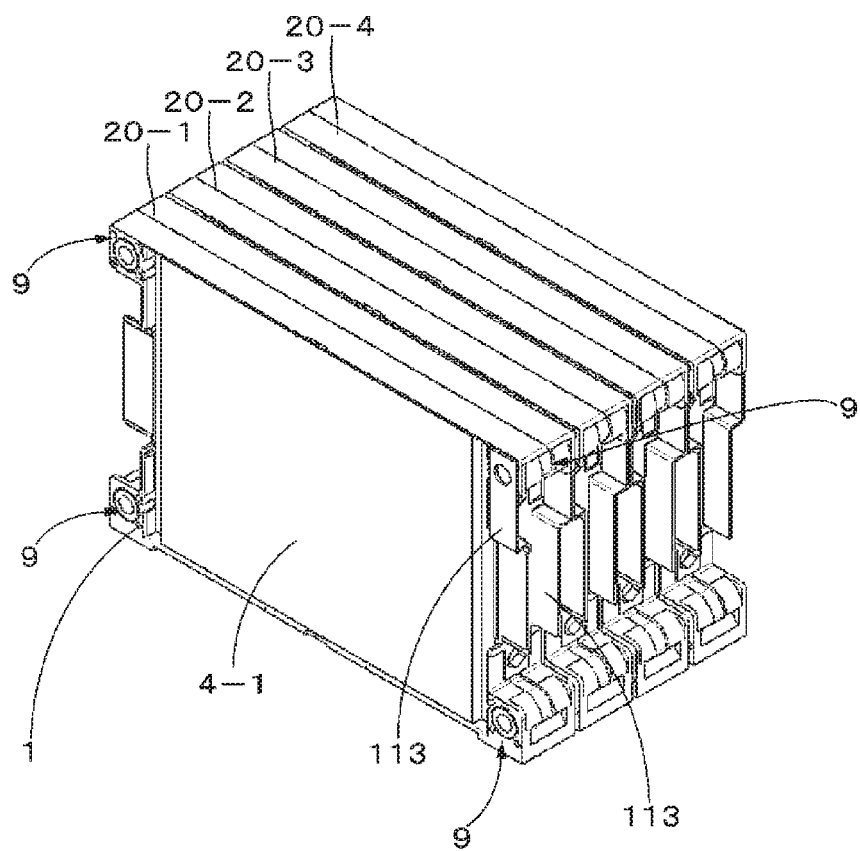
FIG. 10 is a perspective view illustrating four battery units that are stacked and connected.
Figure 11:
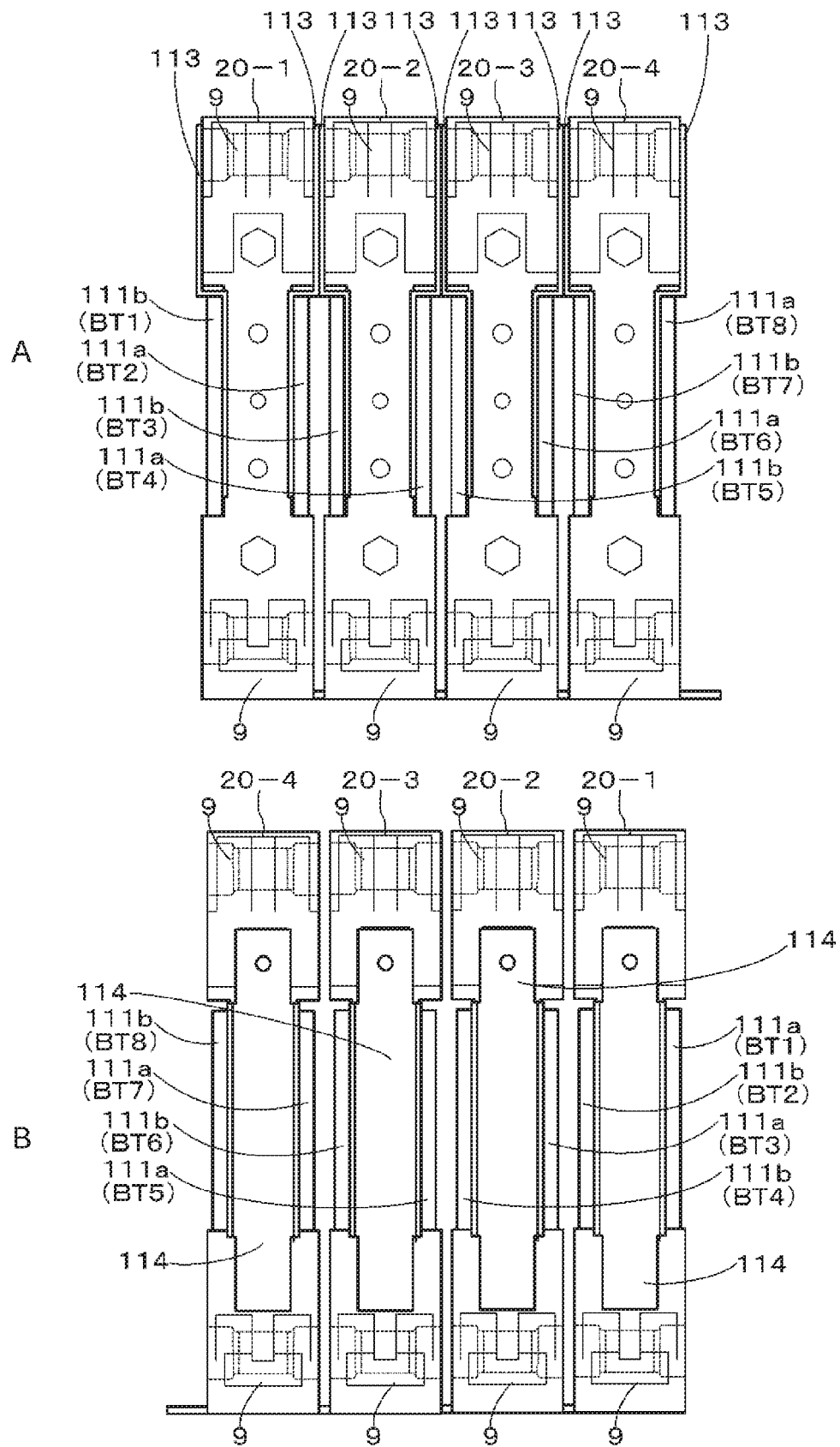
FIG. 11A is a schematic drawing illustrating side faces on the nearside of the four battery units illustrated in FIG. 10.
FIG. 11B is a schematic drawing illustrating side faces on the far side of the four battery units illustrated in FIG. 10.

The connection structure of a plurality of battery cells will be described with reference to the connection structure of four battery units 20-1 to 20-4 of the battery cell group 103 as an example. Note that the battery units 20-5 to 20-8 have a similar connection structure, and the battery unit 20-4 and the battery unit 20-5 also have a similar structure therebetween. FIG. 10 is a perspective view illustrating four battery units that are stacked and connected. FIG. 11A is a schematic drawing illustrating side faces on the near side of the four battery units illustrated in FIG. 10, and FIG. 11B is a schematic drawing illustrating side faces on the far side of the four battery units illustrated in FIG. 10.

A pair of first bus bars 113 is attached to one side face of the battery unit 20-1 in such a manner that the first bus bars 113 face each other with the bracket 1 therebetween. The joining portion 113b of one first bus bar 113 is connected to the negative electrode tab 111b (−pole) of the battery cell BT1, and the close contact portion 113a having the (−) polarity is brought in close contact with the front side of the coupling portions 9 of the bracket 1 of the battery unit 20-1. The joining portion 113b of the other first bus bar 113 is connected to the positive electrode tab 111a (+pole) of the battery cell BT2, and the close contact portion 113a having the (+) polarity is brought in close contact with the rear side of the coupling portions 9 of the bracket 1 of the battery unit 20-1.

One second bus bar 114 is attached to the other side face of the battery unit 20-1. The positive electrode tab 111a (+pole) of the battery cell BT1 is connected to the first joining portion 114a of the second bus bar 114 of the battery unit 20-1, and the negative electrode tab 111b (−pole) of the battery cell BT2 is connected to the second joining portion 114b of the second bus bar 114. In this manner, the battery cell BT1 and the battery cell BT2 are connected in series.

A pair of first bus bars 113 is attached to one side face of the battery unit 20-2 in such a manner that the first bus bars 113 face each other with the bracket 1 therebetween. The joining portion 113b of one first bus bar 113 is connected to the negative electrode tab 111b (−pole) of the battery cell BT3, and the close contact portion 113a having the (−) polarity is brought in close contact with the front side of the coupling portions 9 of the bracket 1 of the battery unit 20-2. In addition, the close contact portion 113a having the (−) polarity of the one first bus bar 113 is brought in close contact with the close contact portion 113a having the (+) polarity, which is in close contact with the rear side of the coupling portions 9 of the bracket 1 of the battery unit 20-1, of the other first bus bar attached to the battery unit 20-1. In this manner, the battery cell BT2 and the battery cell BT3 are connected in series. The joining portion 113b of the other first bus bar 113 is connected to the positive electrode tab 111a (+pole) of the battery cell BT4, and the close contact portion 113a having the (+) polarity is brought in close contact with the face on the rear side of the coupling portions 9 of the bracket 1 of the battery unit 20-1.

One second bus bar 114 is attached to the other side face of the battery unit 20-2. The positive electrode tab 111a (+pole) of the battery cell BT3 is connected to the first joining portion 114a of the second bus bar 114 of the battery unit 20-2, and the negative electrode tab 111b (−pole) of the battery cell BT4 is connected to the second joining portion 114b of the second bus bar 114. In this manner, the battery cell BT3 and the battery cell BT4 are connected in series.

A pair of first bus bars 113 is attached to one side face of the battery unit 20-3 in such a manner that the first bus bars 113 face each other with the bracket 1 therebetween. The joining portion 113b of one first bus bar 113 is connected to the negative electrode tab 111b (−pole) of the battery cell BT5, and the close contact portion 113a having the (−) polarity is brought in close contact with the front side of the coupling portions 9 of the bracket 1 of the battery unit 20-3. In addition, the close contact portion 113a having the (−) polarity of the one first bus bar 113 is brought in close contact with the close contact portion 113a having the (+) polarity, which is in close contact with the rear side of the coupling portions 9 of the bracket 1 of the battery unit 20-2, of the other first bus bar attached to the battery unit 20-2. In this manner, the battery cell BT4 and the battery cell BT5 are connected in series. The joining portion 113b of the other first bus bar 113 is connected to the positive electrode tab 111a (+pole) of the battery cell BT6, and the close contact portion 113a having the (+) polarity is brought in close contact with the face on the rear side of the coupling portions 9 of the bracket 1 of the battery unit 20-2.

One second bus bar 114 is attached to the other side face of the battery unit 20-3. The positive electrode tab 111a (+pole) of the battery cell BT5 is connected to the first joining portion 114a of the second bus bar 114 of the battery unit 20-3, and the negative electrode tab 111b (−pole) of the battery cell BT6 is connected to the second joining portion 114*b* of the second bus bar 114. In this manner, the battery cell BT5 and the battery cell BT6 are connected in series.

A pair of first bus bars 113 is attached to one side face of the battery unit 20-4 in such a manner that the first bus bars 113 face each other with the bracket 1 therebetween. The joining portion 113*b* of one first bus bar 113 is connected to the negative electrode tab 111*b* (−pole) of the battery cell BT7, and the close contact portion 113*a* having the (−) polarity is brought in close contact with the front side of the coupling portions 9 of the bracket 1 of the battery unit 20-4. In addition, the close contact portion 113*a* having the (−) polarity of the one first bus bar 113 is brought in close contact with the close contact portion 113*a* having the (+) polarity, which is in close contact with the rear side of the coupling portions 9 of the bracket 1 of the battery unit 20-3, of the other first bus bar attached to the battery unit 20-3. In this manner, the battery cell BT6 and the battery cell BT7 are connected in series. The joining portion 113*b* of the other first bus bar 113 is connected to the positive electrode tab 111*a* (+pole) of the battery cell BT8, and the close contact portion 113*a* having the (+) polarity is brought in close contact with the face on the rear side of the coupling portions 9 of the bracket 1 of the battery unit 20-3.

One second bus bar 114 is attached to the other side face of the battery unit 20-4. The positive electrode tab 111*a* (+pole) of the battery cell BT7 is connected to the first joining portion 114*a* of the second bus bar 114 of the battery unit 20-4, and the negative electrode tab 111*b* (−pole) of the battery cell BT8 is connected to the second joining portion 114*b* of the second bus bar 114. In this manner, the battery cell BT7 and the battery cell BT8 are connected in series.

(Fixing of a Plurality of Battery Units)

Figure 12:
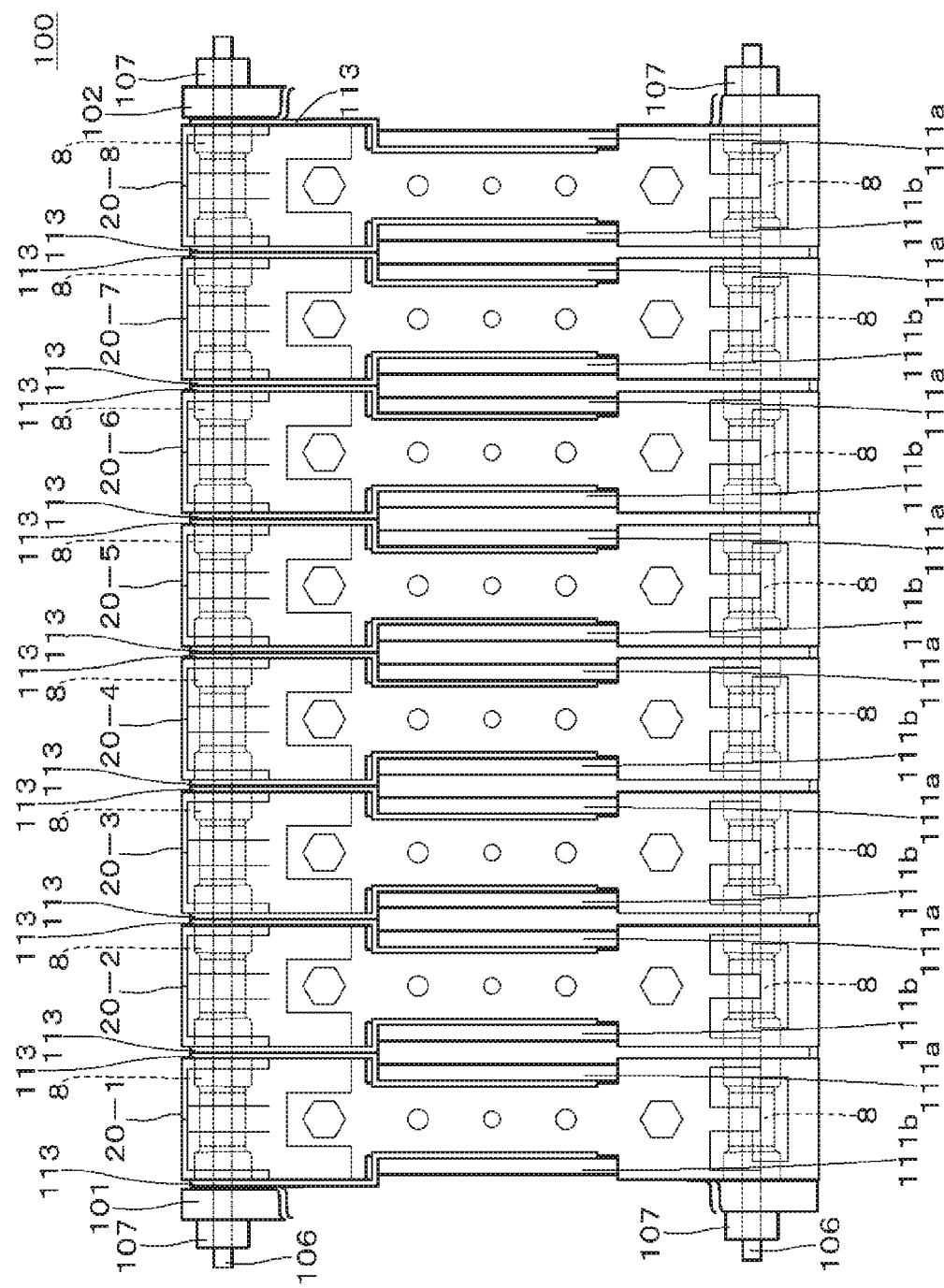
FIG. 12 is a side view illustrating an example configuration of a battery module.

FIG. 12 is a side view illustrating an outline of an example configuration of a battery module. The end plate 101 and the end plate 102 and a plurality of stacked battery units 20-1 to 20-8 constituting the battery cell group 103, which are stacked in the horizontal direction to constitute a stacked structure, are fastened by being tightened by the shafts 106 and the nuts 107, which are fastening members. As illustrated in FIG. 12, the shafts 106 are made to pass through the holes formed in the respective four corners of the end plate 101, the end plate 102, and the battery cell group 103, and both ends of the shafts 106 passing through the four corners are tightened by the nuts 107, so that the stacked battery units 20-1 to 20-8 constituting the battery cell group 103 are fastened. In this manner, the battery units 20-1 to 20-8 are integrally fixed. Note that one shaft 106 passing through one of the four corners passes through the holes 7 formed through the coupling portions 9 of the battery units 20-1 to 20-8 and between both end faces of the coupling portions 9, and through the holes 113*c* of the close contact portions 113*a*, to penetrate through the coupling portions 9 of the battery units positioned on a straight line along the stacking direction, and through the close contact portions 113*a*, the end plate 101, and the end plate 102 between which the coupling portions 9 are present.

In the battery module 100 of the present technology, the close contact portions 113*a* of the first bus bars 113 of adjacent battery units 20 are positioned on a straight line along the stacking direction, and these close contact portions 113*a* are in surface contact with each other, which achieves a stable surface contact between the bus bars. In contrast, in a typical battery module (the battery module 200 illustrated in FIG. 1 described above, for example), when the battery units 210 are arranged and the collectors 211 are connected with each other by the unit bus bars 214, misalignment of the surfaces of adjacent collectors 211 makes it difficult to achieve stable surface contact of the unit bus bars 214. In addition, since high current is applied to the unit bus bars 214, it is difficult to reduce the thickness or the like to make the unit bus bars 214 flexible.

In the battery module of the present technology, the shafts 106 are made to pass through the holes formed in the stacked battery units 20, and both ends of the shafts 106 passing through the stacked battery units 20 are tightened by the nuts 107, so that the stacked battery units 20 are fastened. This enables a uniformly tightening force to be applied to close contact surfaces of the bus bars of adjacent battery units 20. As a result, variation in contact resistance, which is one cause of loss of cell balance, can be reduced. In contrast, in the typical battery module 200 as illustrated in FIG. 1, a plurality of bus bars 214 connecting between battery units 20 are individually tightened, and thus variation in tightening forces leads to variation in contact resistance, which is one cause of loss of cell balance. In addition, axial forces produced at the shafts 106 are defined and controlled, which enables contact resistances of the unit bus bars 214 to be controlled together, and the unit bus bars 214 are fixed in a surface contact state under a constant pressure, which achieves long-term conduction between the unit bus bars 214. As a result, long-term reliability of connection between the battery cells 4 is improved.

(Shaft)

For a shaft 106, an insulating rod member such as a rod member obtained by coating a rod made of a metallic material with at least one insulating layer can be used, for example. The shaft 106 has, at both ends, screw portions or the like on which the nuts 107 or the like, which are tightening members, are screwed. Examples of the insulating layer includes an insulating plastic layer. The shaft 106 is preferably a rod member having two or more insulating layers, which is obtained by coating a rod made of a metallic material with two or more insulating layers. This is because damages on the insulating layers due to vibration, impact, and the like can be reduced. One example of the rod member having two or more insulating layers is a rod member with two insulating layers including a metallic rod, a first insulating layer coating the metallic rod, and a second insulating layer further coating the first insulating layer. An example of the rod member with two insulating layer is a rod member having a coated insulating film formed by application of an insulating material to a metallic rod, and a tubular insulating material covering the coated insulating film. Note that the nuts 107 are preferably insulating. Examples of such nuts 107 are nuts formed by coating metal with an insulating material.

2. Second Embodiment

Figure 13:
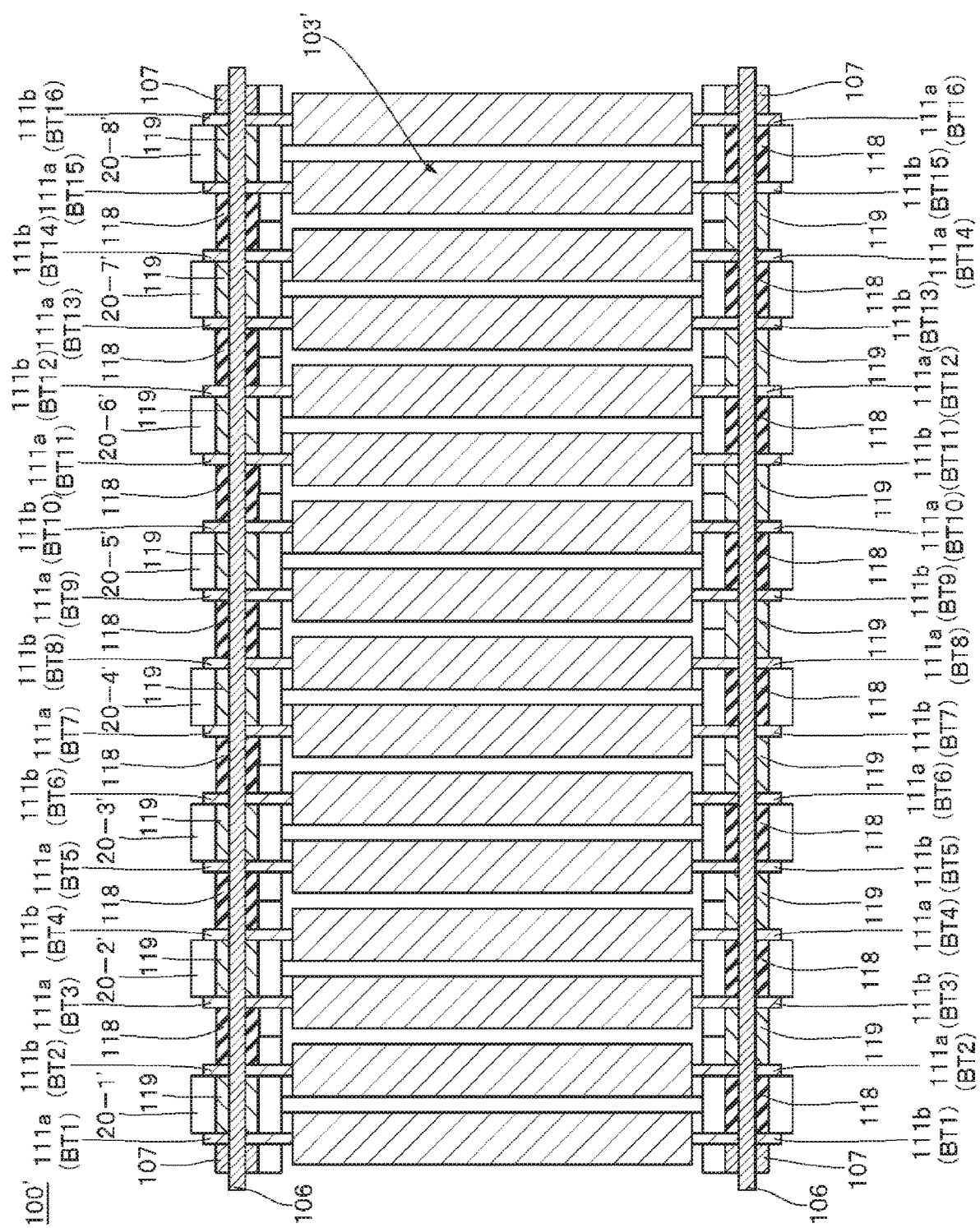
FIG. 13 is a top view illustrating an outline of an example structure of a battery module according to a second embodiment of the present technology.
Figure 14:
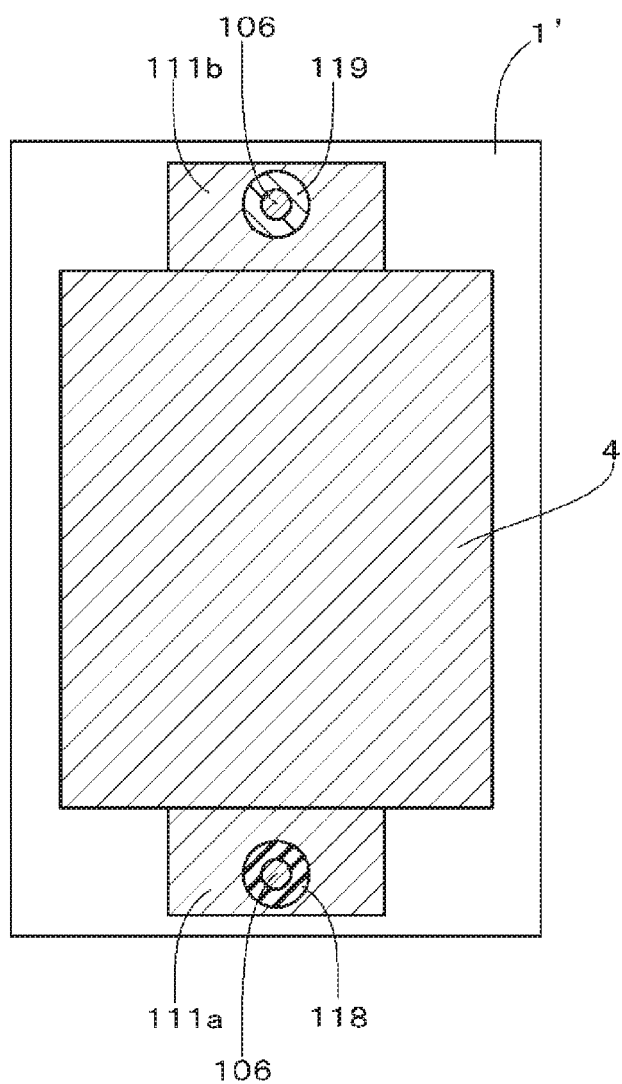
FIG. 14 is a cross-sectional view illustrating an outline of an example structure of the battery module according to the second embodiment of the present technology.

An example structure of a battery module according to a second embodiment the present technology will be described. FIG. 13 is a top view illustrating an outline of an example structure of a battery module according to the second embodiment of the present technology. FIG. 14 is a cross-sectional view illustrating an outline of an example structure of the battery module according to the second embodiment of the present technology.

As illustrated in FIGS. 13 and 14, a battery module 100' includes a battery cell group 103'. The battery cell group 103' includes eight battery units 20-1' to 20-8' (that is, 16 battery cells) that are stacked. Note that the battery units will be simply referred to as battery units 20' when the individual battery units need not be distinguished.

A bracket 1' is similar to the bracket 1 in the first embodiment except that the bracket 1' has the following structure instead of the coupling portions 9. Holes through which the shafts 106 pass in the thickness direction of the bracket 1' are formed at the centers of both side ends of the bracket 1'. For forming the holes, conducting collars 119 or insulating collars 118 are formed integrally with the bracket 1' through insert molding. The conducting collars 119 are hollow, tubular conductive members. The insulating collars 118 are similar to the insulating collars 8 of the first embodiment.

In the battery module 100' according to the second embodiment of the present technology, the conducting collars 119, which are parts for connecting battery cells 4, are insert-molded in the bracket 1', which can save space and improve the battery capacity of the battery module. In contrast, in the typical battery module 200 illustrated in FIG. 1, parts necessary for connection are separate parts fastened by bolts or the like, which results in a larger number of parts.

(Battery Cell)

The battery cells 4 are similar to the battery cells 4 described in the first embodiment except that the battery cells 4 each have a structure in which holes are formed in the electrode tabs 111.

(Connection Structures Between Battery Cells and Between Battery Units)

A plurality of battery units 20' are stacked, and the battery cells 4 are electrically connected in series and/or in parallel, to form the battery cell group 103'.

In one example of the battery units 20' according to the second embodiment of the present technology, 16 battery cells BT1 to BT16 are electrically connected in series, to form the battery cell group 103'. Note that the connection structure of the battery cells BT1 to BT16 is not limited to this example.

The connection structure of a plurality of battery cells 4 will be described with reference to the connection structure of four battery units 20-1' to 20-4' of the battery cell group 103' as an example. Note that the battery units 20-5' to 20-8' have a similar connection structure, and the connection between the battery units 20-4' and the battery unit 20-5' also has a similar structure.

In the battery cell group 103', the battery units 20' are connected by the conducting collars 119, and two battery cells 4 in each of the battery units are similarly connected by the conducting collars 119. In this manner, the battery cells BT1 to BT16 included in the battery cell group 103' are electrically connected in series. Note that, similarly to the first embodiment, two battery cells 4 are accommodated in each of the battery units 20'. Specifically, a battery unit 20-1' includes a battery cell BT1 and a battery cell BT2. A battery unit 20-2' includes a battery cell BT3 and a battery cell BT4. A battery unit 20-3' includes a battery cell BT5 and a battery cell BT6. A battery unit 20-4' includes a battery cell BT7 and a battery cell BT8. A battery unit 20-5' includes a battery cell BT9 and a battery cell BT10. A battery unit 20-6' includes a battery cell BT11 and a battery cell BT12. A battery unit 20-7' includes a battery cell BT13 and a battery cell BT14. A battery unit 20-8' includes a battery cell BT15 and a battery cell BT16.

Both end faces of an insulating collar 118 provided inside the bracket 1' are exposed at substantially the center of one side end of the battery unit 20-1'. Both end faces of a conducting collar 119 provided inside the bracket 1' are exposed at substantially the center of the other side end of the battery unit 20-1'. The negative electrode tab 111*b* (−pole) of the battery cell BT1 is brought in close contact with one end face of the exposed insulating collar 118 of the battery unit 20-1', and the positive electrode tab 111*a* (+pole) of the battery cell BT2 is brought in close contact with the other end face of the exposed insulating collar 118. The positive electrode tab 111*a* (+pole) of the battery cell BT1 is brought in close contact with one end face of the exposed conducting collar 119 of the battery unit 20-1', and the negative electrode tab 111*b* (−pole) of the battery cell BT2 is brought in close contact with the other end face of the conducting collar 119. In this manner, the battery cell BT1 and the battery cell BT2 are connected in series.

A conducting collar 119 is provided between the positive electrode tab 111*a* (+pole) of the battery cell BT2 included in the battery unit 20-1' and the negative electrode tab 111*b* (−pole) of the battery cell BT3 included in the battery unit 20-2'. An insulating collar 118 is provided between the negative electrode tab 111*b* (−pole) of the battery cell BT2 included in the battery unit 20-1' and the positive electrode tab 111*a* (+pole) of the battery cell BT3 included in the battery unit 20-2'.

The positive electrode tab 111*a* (+pole) of the battery cell BT2 is brought in close contact with one end face of the conducting collar 119 provided between the battery cell BT2 and the battery cell BT3, and the negative electrode tab 111*b* (−pole) of the battery cell BT3 is brought in close contact with the other end face of the conducting collar 119. In this manner, the battery cell BT2 and the battery cell BT3 are connected in series.

Both end faces of an insulating collar 118 provided inside the bracket 1' are exposed at substantially the center of one side end of the battery unit 20-2'. Both end faces of a conducting collar 119 provided inside the bracket 1' are exposed at substantially the center of the other side end of the battery unit 20-2'. The negative electrode tab 111*b* (−pole) of the battery cell BT3 is brought in close contact with one end face of the exposed insulating collar 118 of the battery unit 20-2', and the positive electrode tab 111*a* (+pole) of the battery cell BT4 is brought in close contact with the other end face of the exposed insulating collar 118. The positive electrode tab 111*a* (+pole) of the battery cell BT3 is brought in close contact with one end face of the exposed conducting collar 119 of the battery unit 20-2', and the negative electrode tab 111*b* (−pole) of the battery cell BT4 is brought in close contact with the other end face of the conducting collar 119. In this manner, the battery cell BT3 and the battery cell BT4 are connected in series.

A conducting collar 119 is provided between the positive electrode tab 111*a* (+pole) of the battery cell BT4 included in the battery unit 20-2' and the negative electrode tab 111*b* (−pole) of the battery cell BT5 included in the battery unit 20-3'. An insulating collar 118 is provided between the negative electrode tab 111*b* (−pole) of the battery cell BT4 included in the battery unit 20-2' and the positive electrode tab 111*a* (+pole) of the battery cell BT5 included in the battery unit 20-3'.

The positive electrode tab 111*a* (+pole) of the battery cell BT4 is brought in close contact with one end face of the conducting collar 119 provided between the battery cell BT4 and the battery cell BT5, and the negative electrode tab 111*b* (−pole) of the battery cell BT5 is brought in close contact with the other end face of the conducting collar 119. In this manner, the battery cell BT4 and the battery cell BT5 are connected in series.

Both end faces of an insulating collar 118 provided inside the bracket 1' are exposed at substantially the center of one side end of the battery unit 20-3'. Both end faces of a conducting collar 119 provided inside the bracket 1' are exposed at substantially the center of the other side end of the battery unit 20-3'. The negative electrode tab 111*b* (−pole) of the battery cell BT5 is brought in close contact with one end face of the exposed insulating collar 118 of the battery unit 20-3', and the positive electrode tab 111*a* (+pole) of the battery cell BT6 is brought in close contact with the other end face of the exposed insulating collar 118. The positive electrode tab 111*a* (+pole) of the battery cell BT5 is brought in close contact with one end face of the exposed conducting collar 119 of the battery unit 20-3', and the negative electrode tab 111*b* (−pole) of the battery cell BT6 is brought in close contact with the other end face of the conducting collar 119. In this manner, the battery cell BT5 and the battery cell BT6 are connected in series.

A conducting collar 119 is provided between the positive electrode tab 111*a* (+pole) of the battery cell BT6 included in the battery unit 20-3' and the negative electrode tab 111*b* (−pole) of the battery cell BT7 included in the battery unit 20-4'. An insulating collar 118 is provided between the negative electrode tab 111*b* (−pole) of the battery cell BT6 included in the battery unit 20-3' and the positive electrode tab 111*a* (+pole) of the battery cell BT7 included in the battery unit 20-4'.

The positive electrode tab 111*a* (+pole) of the battery cell BT6 is brought in close contact with one end face of the conducting collar 119 provided between the battery cell BT6 and the battery cell BT7, and the negative electrode tab 111*b* (−pole) of the battery cell BT7 is brought in close contact with the other end face of the conducting collar 119. In this manner, the battery cell BT6 and the battery cell BT7 are connected in series.

Both end faces of an insulating collar 118 provided inside the bracket 1' are exposed at substantially the center of one side end of the battery unit 20-4'. Both end faces of a conducting collar 119 provided inside the bracket 1' are exposed at substantially the center of the other side end of the battery unit 20-4'. The negative electrode tab 111*b* (−pole) of the battery cell BT7 is brought in close contact with one end face of the exposed insulating collar 118 of the battery unit 20-4', and the positive electrode tab 111*a* (+pole) of the battery cell BT8 is brought in close contact with the other end face of the exposed insulating collar 118. The positive electrode tab 111*a* (+pole) of the battery cell BT7 is brought in close contact with one end face of the exposed conducting collar 119 of the battery unit 20-4', and the negative electrode tab 111*b* (−pole) of the battery cell BT8 is brought in close contact with the other end face of the conducting collar 119. In this manner, the battery cell BT7 and the battery cell BT8 are connected in series.

(Fixing of a Plurality of Battery Units)

The shafts 106 are made to pass through the respective holes formed at substantially the centers of both side ends of the battery cell group 103', and both ends of the shafts 106 passing through the stacked battery units 20' are tightened by the nuts 107, so that the stacked battery units 20-1' to 20-8' constituting the battery cell group 103' are fastened. Note that, similarly to the first embodiment, the structure may be such that the battery cell group 103' is positioned between the end plate 101 and the end plate 102, and the battery cell group 103' and the end plates 101 and 102 are fastened.

3. Other Embodiments

The present technology is not limited to the embodiments of the present technology described above, but various modifications and applications may be made thereto without departing from the scope of the present technology.

For example, the numerical values, structures, shapes, materials, raw materials, production processes, and the like mentioned in the embodiments described above are only examples, and different numerical values, structures, shapes, materials, raw materials, production processes, and the like may be used where necessary.

In addition, the configurations, methods, processes, shapes, materials, numerical values, and the like in the embodiments described above can be combined with one another without departing from the scope of the present technology.

The present technology can have the following configurations.

[1]

A battery module including:

a stacked structure including at least a plurality of stacked battery units;

an insulating rod member passing through the stacked structure; and a tightening member that tightens the stacked structure from both ends of the insulating rod member passing through the stacked structure, wherein each of the battery units includes:

a plurality of battery cells;

a battery support having a coupling portion through which a first hole penetrating between both end faces of the coupling portion is formed, the battery support holding the battery cells; and a conductive member having a second hole formed therein, and including a close contact portion in close contact with one or another of the both end faces of the coupling portion, and a joining portion connected to an electrode tab of the battery cell, and the insulating rod member passes through the first holes and the second holes of the stacked battery units and penetrates through the coupling portions and the close contact portions of the battery units positioned on a line along a stacking direction, and the tightening member tightens the stacked structure to fasten the battery units, so that the close contact portions of the conductive members of adjacent ones of the battery units are brought in close contact with each other and the adjacent battery units are electrically connected with each other.

[2]

The battery module described in [1], wherein the battery unit includes two conductive members, and the close contact portion of one of the conductive members is brought in close contact with one of the both end faces of the coupling portion, the close contact portion of another of the conductive members is brought in close contact with another of the both end faces of the coupling portion, so that the close contact portions of the two conductive members sandwich the coupling portion.

[3]

The battery module described in either one of [1] and [2], wherein the conductive member is insert-molded in the battery support.

[4]

The battery module described in any one of [1] to [3], wherein the battery support further includes a hollow, tubular insulating member provided inside the coupling portion and forming the first hole.

[5]

The battery module described in [4], wherein the insulating member is insert-molded in the battery support.

[6]
The battery module described in any one of [1] to [5], wherein the conductive member is a conductive plate member.

[7]
The battery module described in any one of [1] to [6], wherein the insulating rod member is a rod member including a rod made of a metallic material and covered with two or more insulating layers.

[8]
The battery module described in any one of [1] to [7], wherein the insulating rod member includes a rod made of a metallic material, a first insulating layer coating the rod made of the metallic material, and a second insulating layer further coating the first insulating layer, the first insulating layer is an insulating film, and the second insulating layer is a tubular insulating material.

[9]
The battery module described in any one of [1] to [8], wherein the insulating rod member has screw portions at both ends, and the tightening member includes nuts screwed on the screw portions.

[10]
The battery module described in any one of [1] to [9], wherein the stacked structure further includes two end plates each having a third hole, the battery units are positioned between the two end plates, and the insulating rod member passes through the third holes of the two end plates to penetrate through the two end plates.

[11]
The battery module described in any one of [1] to [10], wherein the battery support has a substantially rectangular parallelepiped outer shape, the coupling portions protrude at both ends of one side face, and the coupling portions protrude at both ends of another side face.

[12]
An electricity storage device including the battery module described in any one of [1] to [11].

[13]
An electricity storage system wherein the battery module described in any one of [1] to [11] is charged by a power generator configured to generate power from renewable energy.

[14]
An electricity storage system including the battery module described in any one of [1] to [11], for supplying power to an electronic device connected to the battery module.

[15]
An electronic device that receives power supply from the battery module described in any one of [1] to [11].

[16]
An electric-powered vehicle including:

a converter for receiving electric power supply from the battery module described in any one of [1] to [11], and converting the electric power into driving power for the vehicle; and a controller for performing information processing on vehicle control on the basis of information on the battery module.

[17]
A power system including:

a power information transmitting/receiving unit for transmitting/receiving signals from another device via a network, wherein the power system performs charge/discharge control of the battery module described in any one of [1] to [11] according to information received by the power information transmitting/receiving unit.

[18]
A power system for receiving power supply from the battery module described in any one of [1] to [11] and supplying power to the battery module from a power generator or a power grid.

4. Applications

Hereinafter, applications of the battery module will be described. Note that the applications of the battery module are not limited to those described below.

The battery module of the present technology described above can be mounted on or used for power supply to equipment such as electronic devices and electric-powered vehicles. The present technology is an electricity storage system in which the battery module described above is charged by a power generator that generates power from renewable energy. The present technology is an electricity storage system that includes the battery module described above, and supplies power to an electronic device connected to the battery module. The present technology is an electronic device that receives power supply from the battery module described above. These electronic device and power system are embodied as a power supply system in a home, for example. Furthermore, the electronic device and power system are embodied as a system for efficiently supply power in cooperation with an external electricity grid. Furthermore, the present technology is an electric-powered vehicle including a converter for receiving electric power supply from the battery module described above and converting the electric power into driving power for the vehicle, and a controller for performing information processing on vehicle control on the basis of information on the battery module. The present technology is a power system including a power information transmitting/receiving unit for transmitting/receiving signals to/from other devices via a network, for performing charge/discharge control of the battery module described above on the basis of information received by the power information transmitting/receiving unit. The present technology is a power system for receiving power supply from the battery module described above, and supplying power to the battery module from a power generator or a power grid.

Examples of the electronic device include a laptop personal computer, a video movie, a digital still camera, an electronic book, a game machine, a navigation system, an electric tool, a refrigerator, an air conditioner, a television set, a stereo, a water heater, a microwave oven, a dishwashing machine, a washing machine, a drier, lighting equipment, a medical device, a robot, a road conditioner, and a traffic light.

In addition, examples of the electric-powered vehicle includes a railroad vehicle, a golf cart, an electric cart, and an electric vehicle (including a hybrid electric vehicle), and the battery module is used as a driving power source or an auxiliary power source thereof.

"Example of Electricity Storage Device as Application"

Figure 15:
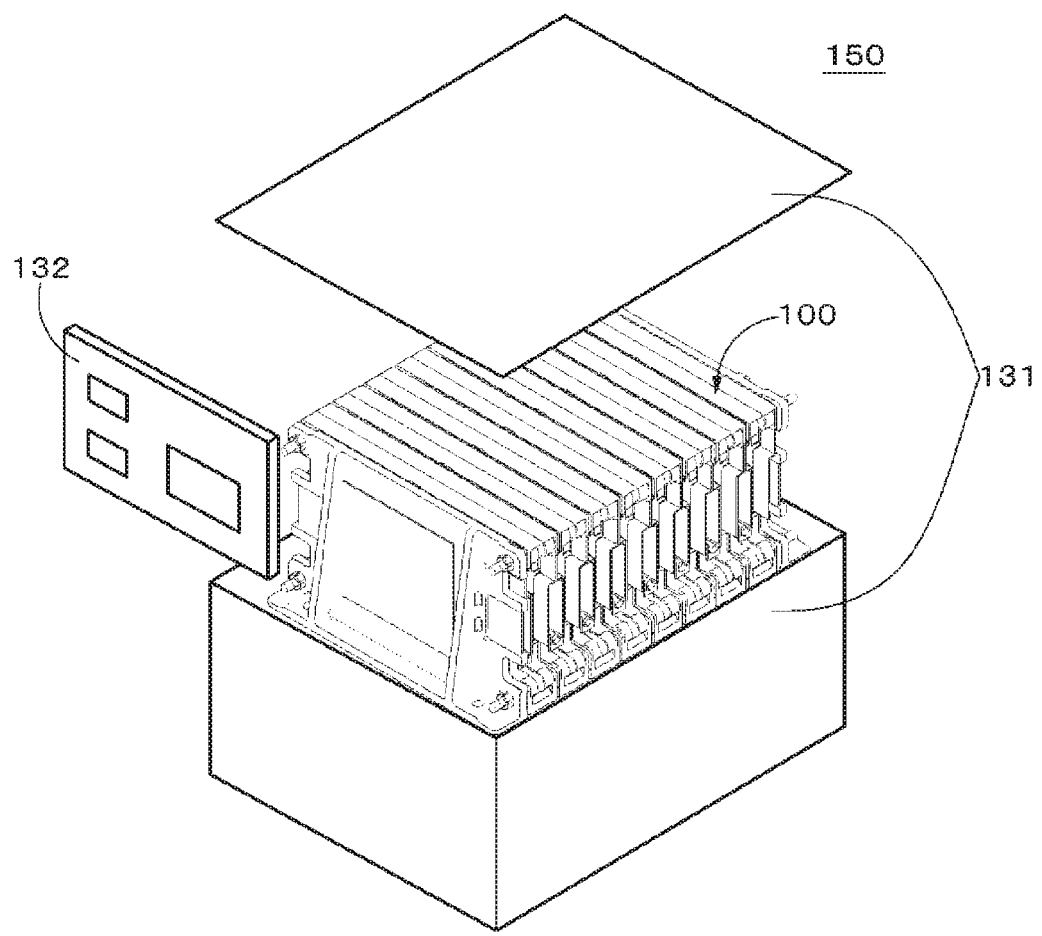
FIG. 15 is an exploded perspective view illustrating an example configuration of an electricity storage device including a battery module.

One example of an electricity storage device including a battery module is an electricity storage device having a configuration illustrated in FIG. 15. As illustrated in FIG. 15, a battery module 100, a circuit board 132 on which a control circuit block for controlling charge/discharge of the battery module 100 and the like are mounted, and the like are housed in an exterior case 131 of an electricity storage device 150.

"Example of Electricity Storage System in Home as Application"

Figure 16:
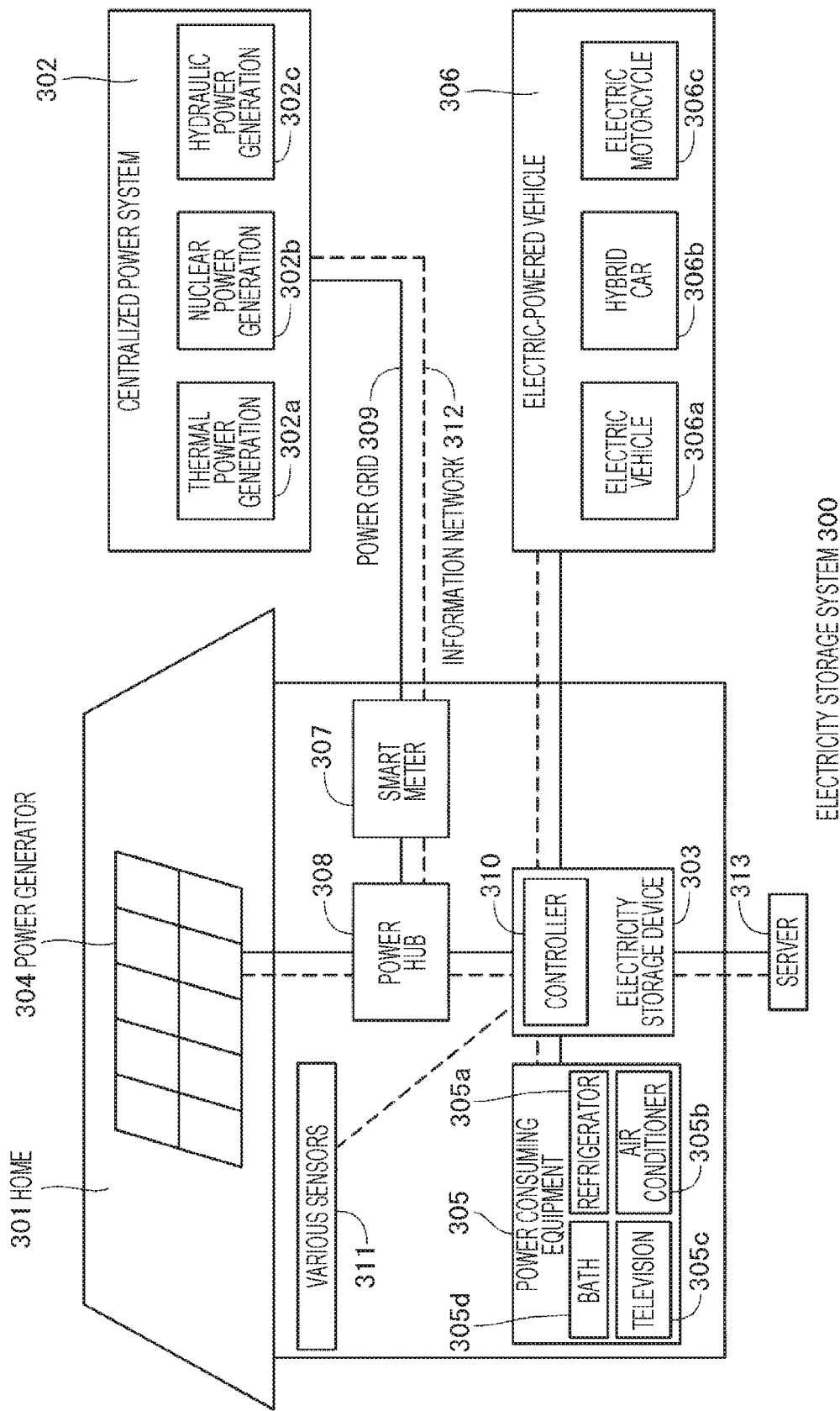
FIG. 16 is a block diagram for explaining an application of a battery module of the present technology.

An example in which the present technology is applied to a home electricity storage system will be described with reference to FIG. 16. For example, in an electricity storage system 300 for a home 301, electric power is supplied to an electricity storage device 303 from a centralized power system 302 of thermal power generation 302a, nuclear power generation 302b, hydraulic power generation 302c, and the like via a power grid 309, an information network 312, a smart meter 307, a power hub 308, and the like. In addition, electric power is supplied to the electricity storage device 303 from an independent power source such as a power generator 304. The electric power supplied to the electricity storage device 303 is stored. The electricity storage device 303 is used to supply electric power to be used in the home 301. Similar electricity storage systems can also be used for buildings in addition to the home 301.

In the home 301, a power generator 304, power consuming equipment 305, the electricity storage device 303, a controller 310 for controlling the devices, a smart meter 307, and sensors 311 for acquiring a variety of information. The respective devices are connected via the power grid 309 and the information network 312. Solar cells, fuel cells, or the like are used as the power generator 304, and power generated thereby is supplied to the power consuming equipment 305 and/or the electricity storage device 303. The power consuming equipment 305 includes a refrigerator 305a, an air conditioner 305b, a television receiver (television set) 305c, a bath 305d, and the like. Furthermore, the power consuming equipment 305 includes an electric-powered vehicle 306. The electric-powered vehicle 306 includes an electric vehicle 306a, a hybrid car 306b, and an electric motorcycle 306c.

The battery module of the present technology described above is applied to the electricity storage device 303. The electricity storage device 303 is constituted by secondary batteries or capacitors. For example, the electricity storage device 303 is constituted by lithium-ion batteries. The lithium-ion batteries may be of a stationary type or may be used in the electric-powered vehicle 306. The smart meter 307 has functions of measuring consumption of commercial power and transmitting the measured consumption to an electricity company. The power grid 309 may be any one of DC power supply, AC power supply, and non-contact power supply, or a combination thereof.

Examples of the various sensors 311 include a motion sensor, an illuminance sensor, an object sensor, a power consumption sensor, a vibration sensor, a contact sensor, a temperature sensor, and an infrared sensor. Information acquired by the sensors 311 is sent to the controller 310. Weather conditions, human conditions, and the like are obtained according to information from the sensors 311, which allows automatic control of the power consuming equipment 305 to minimize energy consumption. Furthermore, the controller 310 can transmit information on the home 301 to an external electricity company or the like via the Internet.

The power hub 308 performs processing such as making a power line diverge, DC/AC conversion, and the like. Examples of the communication method for the information network 312 connected with the controller 310 include a method using a communication interface such as Universal Asynchronous Receiver-Transceiver (UART), and a method using a sensor network according to a radio communication standard such as Bluetooth, ZigBee, or Wi-Fi. The Bluetooth method is applicable to multimedia communication and enables communication through one-to-many connection. ZigBee uses a physical layer of IEEE (Institute of Electrical and Electronics Engineers) 802.15.4. IEEE802.15.4 is the name of a short-range wireless network standard called a personal area network (PAN) or wireless (W) PAN.

The controller 310 is connected with an external server 313. The server 313 may be controlled by any of the home 301, an electricity company, and a service provider. Examples of information transmitted/received by the server 313 include power consumption information, life pattern information, electricity rates, weather information, disaster information, and information on electricity transactions. The information may be transmitted/received to/from power consuming equipment (a television receiver, for example) in a home, or may be transmitted/received from a device (a portable phone, for example) outside of a home. The information may be displayed on a device having display functions, such as a television receiver, a portable phone, a personal digital assistant (PDA), or the like.

The controller 310 for controlling the respective units includes a central processing unit (CPU), a random access memory (RAM), a read only memory (ROM), and the like, and is stored in the electricity storage device 303 in this example. The controller 310 is connected with the electricity storage device 303, the power generator 304, the power consuming equipment 305, the various sensors 311, and the server 313 via the information network 312, and has functions of adjusting the consumption of commercial power and power generation, for example. Note that the controller 310 may also have other functions such as functions of performing electricity transactions in an electricity market.

As described above, not only power from the centralized power system 302 such as the thermal power generation 302a, the nuclear power generation 302b, and the hydraulic power generation 302c, power generated by the power generator 304 (photovoltaic power generation, wind power generation) can also be stored in the electricity storage device 303. Thus, even if the amount of power generated by the power generator 304 fluctuates, control such as making the amount of power to be transmitted to the outside constant or discharging by a necessary amount can be performed. For example, power may be used in such a manner that power acquired by photovoltaic power generation is stored in the electricity storage device 303, power at a lower late-night rate is stored in the electricity storage device 303, and power stored in the electricity storage device 303 is discharged for use during the day when the rate is high.

Note that an example in which the controller 310 is stored in the electricity storage device 303 has been described in this example; however, the controller 310 may be stored in the smart meter 307 or may be a single unit. Furthermore, the electricity storage system 300 may be used for multiple homes in a housing complex, or may be used for a plurality of single-family houses.

"Electricity Storage System in Vehicle as Application"

Figure 17:
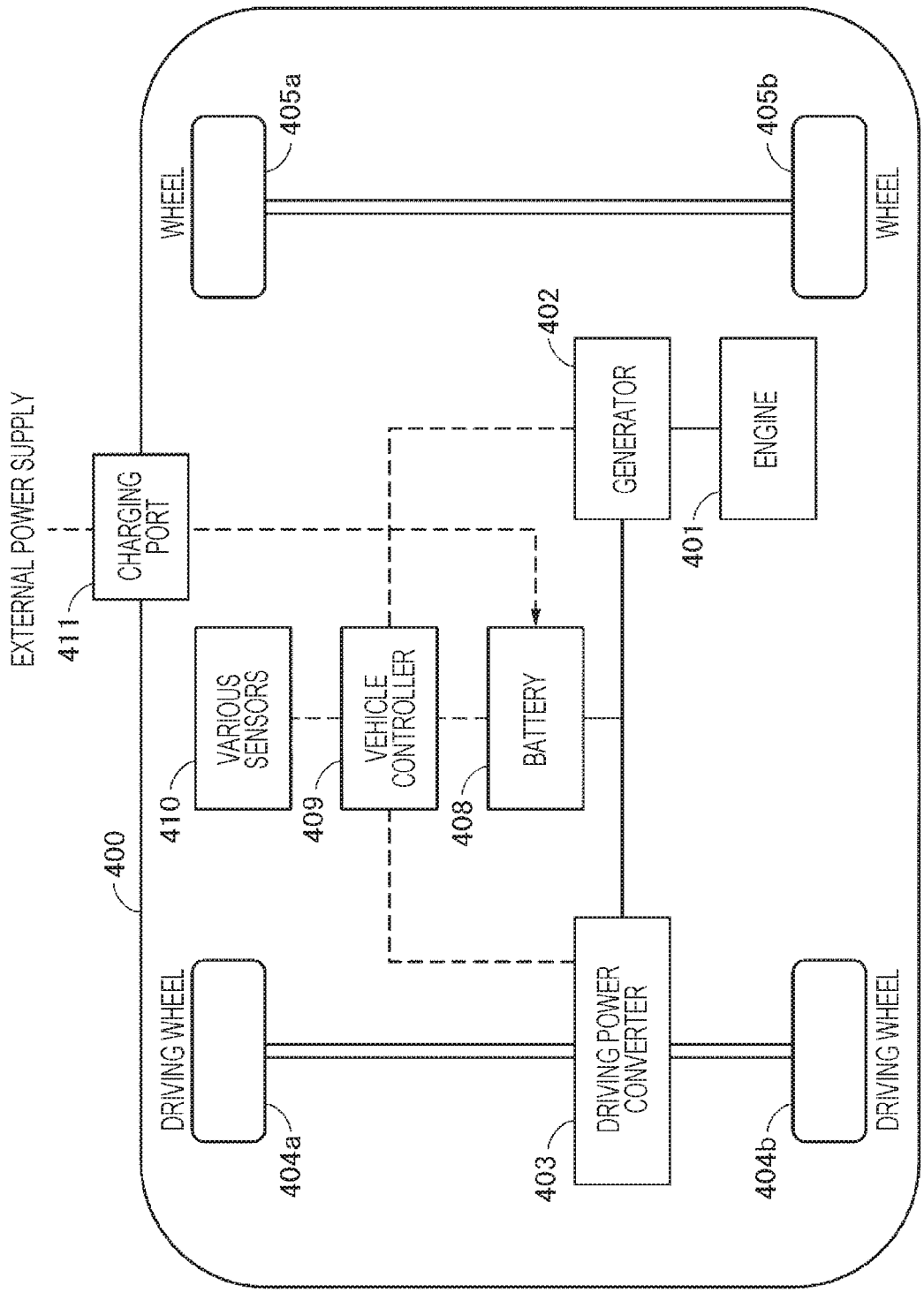
FIG. 17 is a block diagram for explaining an application of a battery module of the present technology.

An example in which the present technology is applied to an electricity storage system for a vehicle will be described with reference to FIG. 17. FIG. 17 schematically illustrates one example of a configuration of a hybrid vehicle employing a series-hybrid system to which the present technology is applied. The series-hybrid system is a vehicle using power generated by a generator driven by an engine or power obtained by temporarily storing the generated power in a battery, and being driven by an electric power/driving power converter.

The hybrid vehicle 400 has mounted thereon an engine 401, a generator 402, an electric power/driving power converter 403, a driving wheel 404a, a driving wheel 404b, a wheel 405a, a wheel 405b, a battery 408, a vehicle controller 409, various sensors 410, and a charging port 411. The battery module of the present technology described above is applied to the battery 408.

The hybrid vehicle 400 travels using the electric power/driving power converter 403 as a power source. One example of the electric power/driving power converter 403 is a motor. The electric power/driving power converter 403 is activated by power from the battery 408, and the torque of the electric power/driving power converter 403 is transmitted to the driving wheels 404a and 404b. Note that DC-AC conversion or inverse conversion (AC-DC conversion) can be used where necessary, so that the electric power/driving power converter 403 can be applied to either of an AC motor and a DC motor. The various sensors 410 controls the engine speed, and controls the opening degree of a not-shown throttle valve (throttle opening degree) via the vehicle controller 409. The various sensors 410 includes a speed sensor, an acceleration sensor, an engine speed sensor, and the like.

The torque of the engine 401 is transmitted to the generator 402, and power generated by the generator 402 according to the torque can be stored in the battery 408.

When the hybrid vehicle is decelerated by a not-shown brake mechanism, the resistance during the deceleration is applied to the electric power/driving power converter 403 as a torque, and regenerative electric power generated by the electric power/driving power converter 403 according to the torque is stored in the battery 408.

The battery 408 can also be connected to an external power supply of the hybrid vehicle, so as to receive power supply from the external power supply through the charging port 411, which is an inlet port, and store the received power.

Although not illustrated, an information processing device for processing information on vehicle control on the basis of information on a secondary battery may be provided. An example of the information processing device in an information processing device that displays a remaining battery level on the basis of information on the remaining battery level.

Note that an example of a series-hybrid vehicle using power generated by the generator driven by the engine or power obtained by temporarily storing the generated power in the battery and being driven by a motor has been described above. The present technology, however, is also effectively applicable to a parallel-hybrid vehicle using power output from both of an engine and a motor as driving sources, and switching between three modes of being driven only by the engine, being driven only by the motor, and being driven by the engine and the motor. Furthermore, the present technology is also effectively applicable to a so-called electric-powered vehicle driven only by a drive motor without using an engine.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 1, 1' Bracket
2 Heat transfer plate
2a Bent portion
4 Battery cell
4-1, 4-2 Battery cell
7 Hole
8 Insulating collar
9 Coupling portion
20 Battery unit
20' Battery unit
20-1 to 20-8, 20-1' to 20-8' Battery unit
90 Exterior case
100, 100' Battery module
101 End plate
102 End plate
103, 103' Battery cell group
106 Shaft
107 Nut
108 Heat transfer plate
111 Electrode tab
111a Positive electrode tab
111b Negative electrode tab
113 First bus bar
114 Second bus bar
118 Insulating collar
119 Conducting collar
121 Cell element
122 Exterior material
122A First exterior portion
122B Second exterior portion
123 Recessed portion
300 Electricity storage system
301 Home
302 Centralized power system
302a Thermal power generation
302b Nuclear power generation
302c Hydraulic power generation
303 Electricity storage device
304 Power generator
305 Power consuming equipment
305a Refrigerator
306 Electric-powered vehicle
306a Electric vehicle
306b Hybrid car
306c Electric motorcycle
307 Smart meter
308 Power hub
309 Power grid
310 Controller
311 Sensor
312 Information network
313 Server
400 Hybrid vehicle
401 Engine
402 Generator
403 Electric power/driving power converter
404a Driving wheel
404b Driving wheel
405a Wheel
405b Wheel 408 Battery
409 Vehicle controller
410 Sensor
411 Charging port

The invention claimed is:

1. A battery module comprising:
a stacked structure including at least a plurality of stacked battery units;
an insulating rod member passing through the stacked structure; and
a tightening member that tightens the stacked structure from both ends of the insulating rod member passing through the stacked structure, wherein
each of the battery units includes:
a plurality of battery cells;
a battery support having a coupling portion through which a first hole penetrating between both end faces of the coupling portion is formed, the battery support holding the plurality of battery cells; and
a conductive member having a second hole formed therein, and including a close contact portion in close contact with one or another of the both end faces of the coupling portion, and a joining portion in close contact to an electrode tab of the plurality of battery cells, wherein the close contact portion protrudes from the joining portion in a horizontal direction, and
the insulating rod member passes through first holes and second holes of the stacked battery units and penetrates through coupling portions and close contact portions of the battery units positioned on a line along a stacking direction, and the tightening member tightens the stacked structure to fasten the battery units, so that the close contact portions of conductive members of adjacent ones of the battery units are brought in close contact with each other and the adjacent battery units are electrically connected with each other.

2. The battery module according to claim 1, wherein
each of the battery units includes two conductive members, and
the close contact portion of one of the conductive members is brought in close contact with one of the both end faces of the coupling portion, the close contact portion of another of the conductive members is brought in close contact with another of the both end faces of the coupling portion, so that the close contact portions of the two conductive members sandwich the coupling portion.

3. The battery module according to claim 1, wherein the conductive member is insert-molded in the battery support.

4. The battery module according to claim 1, wherein the battery support further includes a hollow, tubular insulating member provided inside the coupling portion and forming the first hole.

5. The battery module according to claim 4, wherein the tubular insulating member is insert-molded in the battery support.

6. The battery module according to claim 1, wherein the conductive member is a conductive plate member.

7. The battery module according to claim 1, wherein the insulating rod member is a rod member including a rod made of a metallic material and covered with two or more insulating layers.

8. The battery module according to claim 1, wherein
the insulating rod member includes a rod made of a metallic material, a first insulating layer coating the rod made of the metallic material, and a second insulating layer further coating the first insulating layer,
the first insulating layer is an insulating film, and
the second insulating layer is a tubular insulating material.

9. The battery module according to claim 1, wherein
the insulating rod member has screw portions at both ends, and
the tightening member includes nuts screwed on the screw portions.

10. The battery module according to claim 1, wherein
the stacked structure further includes two end plates each having a third hole,
the battery units are positioned between the two end plates, and
the insulating rod member passes through the third holes of the two end plates to penetrate through the two end plates.

11. The battery module according to claim 1, wherein the battery support has a substantially rectangular parallelepiped outer shape, the coupling portions protrude at both ends of one side face, and the coupling portions protrude at both ends of another side face.

12. An electricity storage device comprising the battery module according to claim 1.

13. An electricity storage system wherein the battery module according to claim 1 is charged by a power generator configured to generate power from renewable energy.

14. An electricity storage system comprising the battery module according to claim 1, for supplying power to an electronic device connected to the battery module.

15. An electronic device that receives power supply from the battery module according to claim 1.

16. An electric-powered vehicle comprising:
a converter for receiving electric power supply from the battery module according to claim 1, and converting the electric power into driving power for the vehicle; and
a controller for performing information processing on vehicle control on the basis of information on the battery module.

17. A power system comprising:
a power information transmitting/receiving unit for transmitting/receiving signals from another device via a network, wherein
the power system performs charge/discharge control of the battery module according to claim 1 according to information received by the power information transmitting/receiving unit.

18. A power system for receiving power supply from the battery module according to claim 1 or supplying power to the battery module from a power generator or a power grid.

* * * * *